United States Patent
Chretien

(10) Patent No.: US 10,144,507 B2
(45) Date of Patent: Dec. 4, 2018

(54) ELECTROMAGNETIC DISTRIBUTED DIRECT DRIVE FOR AIRCRAFT

(71) Applicant: Pascal Chretien, Oxley (AU)

(72) Inventor: Pascal Chretien, Oxley (AU)

( * ) Notice: Subject to any disclaimer, the term of this patent is extended or adjusted under 35 U.S.C. 154(b) by 0 days.

(21) Appl. No.: 15/506,912

(22) PCT Filed: Aug. 7, 2015

(86) PCT No.: PCT/EP2015/068229
§ 371 (c)(1),
(2) Date: Feb. 27, 2017

(87) PCT Pub. No.: WO2016/030168
PCT Pub. Date: Mar. 3, 2016

(65) Prior Publication Data
US 2017/0274992 A1    Sep. 28, 2017

(30) Foreign Application Priority Data

Aug. 28, 2014   (AU) ................................ 2014903429
Aug. 29, 2014   (AU) ................................ 2014903430

(51) Int. Cl.
| | |
|---|---|
| H02K 11/33 | (2016.01) |
| H02K 21/14 | (2006.01) |
| B64D 35/02 | (2006.01) |
| B64D 27/24 | (2006.01) |
| H02K 21/24 | (2006.01) |
| B64C 27/14 | (2006.01) |

(Continued)

(52) U.S. Cl.
CPC .............. *B64C 27/14* (2013.01); *B64D 27/24* (2013.01); *B64D 35/02* (2013.01); *H02K 11/33* (2016.01); *H02K 16/00* (2013.01); *H02K 21/14* (2013.01); *H02K 21/24* (2013.01); *H02K 2213/06* (2013.01); *H02K 2213/12* (2013.01); *Y02T 50/44* (2013.01); *Y02T 50/64* (2013.01)

(58) Field of Classification Search
None
See application file for complete search history.

(56) References Cited

U.S. PATENT DOCUMENTS 9,819,297 B2 * 11/2017 Yamada ................... H02P 27/06
2003/0102751 A1   6/2003 Bryant
2006/0113933 A1   6/2006 Blanding et al.
(Continued)

FOREIGN PATENT DOCUMENTS

EP   2551198 A1   1/2013
EP   2610176 A1   7/2013

OTHER PUBLICATIONS

International Search Report dated Dec. 7, 2015 issued in corresponding PCT/EP2015/068229; 3pgs.

*Primary Examiner* — Bickey Dhakal
*Assistant Examiner* — Said Bouziane
(74) *Attorney, Agent, or Firm* — Maier & Maier, PLLC

(57) ABSTRACT

A fault tolerant, optically or electrically managed, EMP resilient electromagnetic distributed direct drive powertrain applied to provide lift and/or propulsion and/or attitude control to an aircraft. The electromagnetic distributed direct drive being network based, capable of autonomous operations and decisions such as pilot input interpreting mode, load distribution, fault management, self-healing operations, electrical and mechanical health monitoring, as well as electrical and mechanical fault prediction.

27 Claims, 19 Drawing Sheets

(51) Int. Cl.
*H02K 16/00* (2006.01)
*H02P 25/00* (2006.01)

(56) References Cited

U.S. PATENT DOCUMENTS

| | | | |
|---|---|---|---|
| 2011/0301787 A1 | 12/2011 | Chaperon et al. | |
| 2012/0228965 A1* | 9/2012 | Bang .................... | H02K 7/1838 310/12.18 |
| 2014/0354087 A1* | 12/2014 | Kato .................... | H02K 11/046 310/43 |

\* cited by examiner 13L             13R

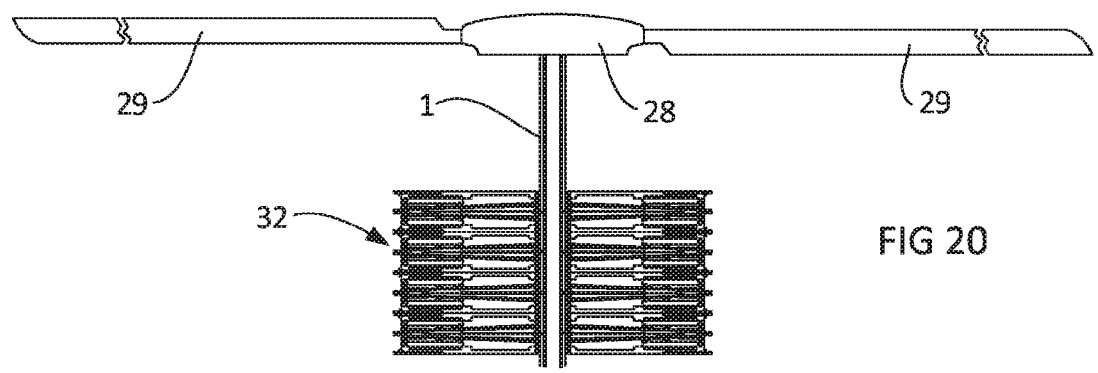
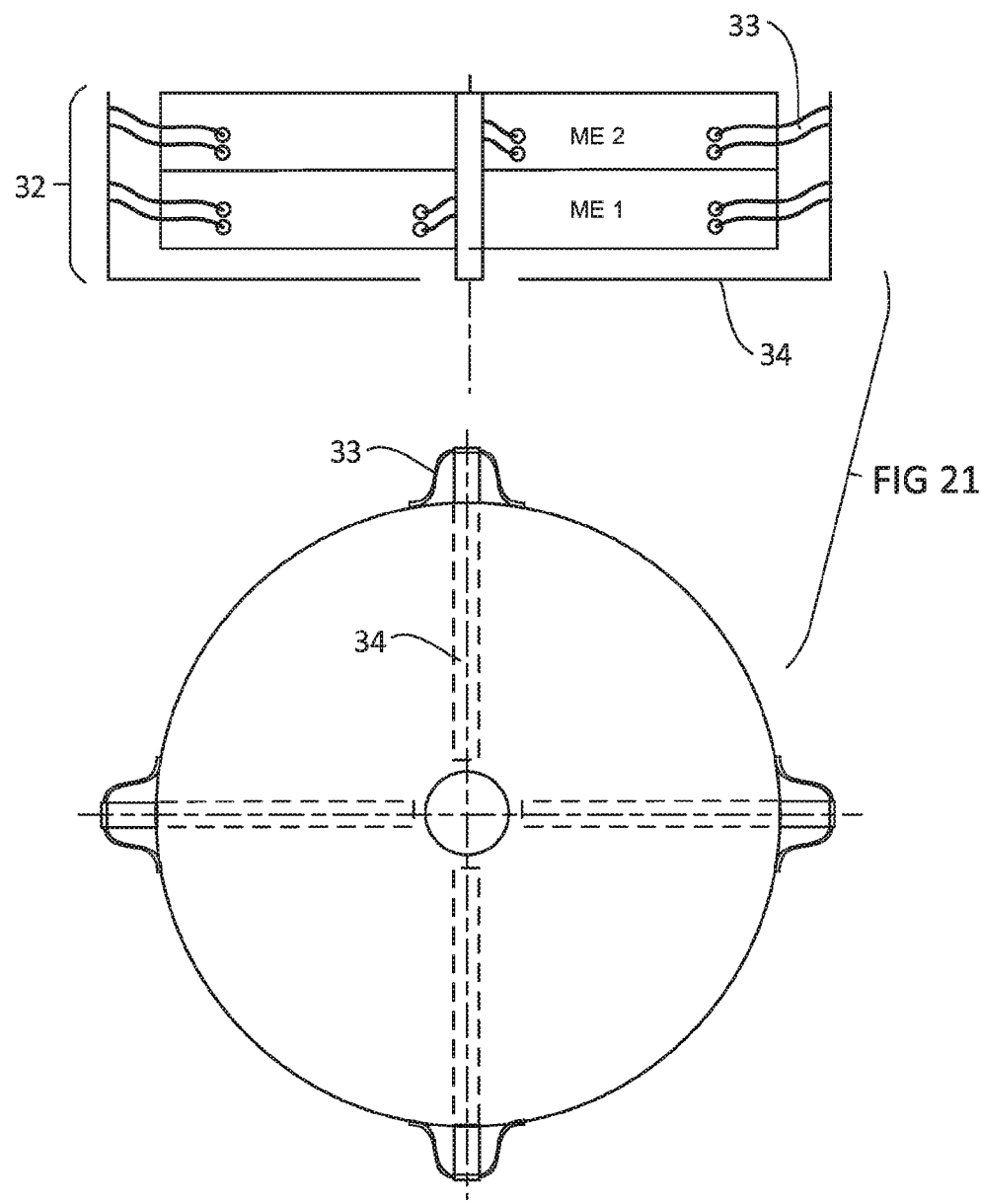

ELECTROMAGNETIC DISTRIBUTED DIRECT DRIVE FOR AIRCRAFT

TECHNICAL FIELD OF THE INVENTION

An optically or electrically interconnected electromagnetic distributed direct drive (also referred to as $EMD^3$) provides an alternative to legacy mechanical drive train traditionally installed in conventional rotary-wing or fixed-wing aircrafts.

BACKGROUND

Conventional rotary-wing aircrafts use a set of complex mechanical gearboxes that convert the high rotation speed of gas turbines into the low speed/high torque required to drive the rotor(s). Unlike powerplant, mechanical gearboxes cannot be duplicated for redundancy, hence remain a known single point of failure (SPOF) consistently affecting helicopter reliability and safety. In-flight catastrophic gear failure usually results in gearbox jamming and subsequent fatalities, whereas loss of lubrication can trigger onboard fire. This fact is eloquently documented by regular crash reports issued by government bodies in charge of civil and military aviation (e.g. EASA, BASI and NTSB). Furthermore, a well-known operational weakness of mechanical gearboxes is their inherent transient power limitation due to material and structural fatigue limits. Gears are the most vulnerable to fatigue. Aerial work operations such as sling load, long line and helicopter logging experience the highest rate of crashes and fatalities resulting from fatigue induced transmission failure.

Another limitation of mechanical gearboxes is their fixed reduction ratio, precluding fuel saving during cruise when the main rotor speed of helicopters could be slightly reduced in view of lowering aerodynamic losses.

Electric drive trains have recently been integrated in light recreational airplanes in the form of small powerplant. However, those propulsion systems are usually developed around standard off-shelf components. The usual split configuration includes one or more electric motor(s) powered by one or more separate controller(s) altogether managed by an external control unit. Beyond the fact that such architecture is littered with single points of failure (SPOF) leading to unacceptable failure rates as per commercial aviation standards (1.10-4 to 1.10-5 failure/hour, for an objective better than 1.10-7), the main problem resides in the poor electromagnetic compatibility with the surrounding environment (commonly failing MIL-STD-461/462 and EMP standards). Fast switching power circuitry (such as IGBT and/or MOS-FETS) commonly used in motor controller to minimize power losses is one cause of the electromagnetic compatibility problem. Such circuitry produces high order harmonics, hence significant interference with surrounding avionics and onboard electronic systems. Interferences are generated by the controller units in two forms: Radiated Emissions (RE) and/or Conducted Emissions (CE). The former refers to free space propagation of electromagnetic radio waves, whereas the later refers to electromagnetic signals propagating along the power lines and data cables, potentially disturbing the operation of aircraft's systems. Radiated emissions suppression usually requires installing heavy metallic shielding around the controller unit, whereas conducted emissions are mitigated by using inherently heavy inline filters inserted in the controllers' DC power ports, combined with shielded cables. Additionally, a multitude of inline filters needs to be installed on the inputs/output ports (power supply and data lines) of each avionic system operating in the vicinity of the electric powerplant. If those somewhat heavy fixes can mitigate the detrimental effect of conducted emissions, they have a very negative impact on system's weight.

In addition to generating interferences, such architecture is vulnerable to onboard and/or external electromagnetic interferences. Onboard interferences are generated by avionics systems such as radar transponder, DME, radio-altimeter, weather radar, HF/VHF/UHF transceivers, ECM/ECCM (electronic counter measures and electronic counter-counter measures), whereas external interferences may originate from a wide variety of sources such as EMP weaponry, high altitude nuclear detonation, ECM attack, strong RF signals from ground RADAR, electromagnetic beam weaponry or other sources. There have been reported cases of in-flight motor stoppage resulting from onboard avionics interference, or when flying in the vicinity of radio transmission towers.

The foregoing problems present a major limitation to the operational use of electric propulsion technologies in aircraft. From a military standpoint, current electric propulsion systems are unacceptably vulnerable and cannot be deployed on the modern battlefield.

Lastly, the vast majority of today's electric drives do not meet hardening requirements against lighting strike and electrostatic discharges (ESD). In their present form, electrical drives are inherently vulnerable and unable to survive such event, whereas aircrafts operating in IFR (Instrument Flight Rules) condition must withstand direct lightning strike and strong ESD discharges.

In any avionics system, data lines are the most vulnerable to external RF interference and ESD discharges as they carry small signals and connect to the most sensitive and fragile components. The present invention discloses a fault tolerant direct drive system, inherently more reliable than mechanical gearboxes, offering better mechanical fatigue resistance, as well as being robust against electromagnetic interferences, EMP and ESD aggressions.

PRIOR ART

US 2009/0140095 A1. Jayant Sirhoi et Al. Filed: Nov. 30, 2007; Published: Jun. 4, 2009. Discloses an electrically powered notional rotorcraft where main and tail rotors are directly driven by electric motors. This system includes: an electric motor, the rotor of which is coaxial with the main rotor of the helicopter; a pack of batteries capable on their own of supplying the electric motor via an external controller and an electric tail rotor including a motor and its associated controller driving the tail rotor. The safety of the aircraft would no longer be adequately assured in the event of the failure of one of the electric motors. The motors and controllers are physically separated and interconnected via power cabling, inducing vulnerability to EMP, EMI, ESD aggressions combined with added system weight. This layout is presented at system level and does not disclose any fault tolerant topologies, or any form of solution addressing EMP, EMI, ESD hardening; that is, in the event of strong electromagnetic pulses, radio interference, lightening strike, or strong ESD discharge the controllers' integrity may be compromised and the craft's safety will be jeopardized.

FR2957207 (A1), Pascal Chretien et al; Filed: Mar. 5, 2010; Published: Sep. 9, 2011 (Generic direct drive; multi-applications). FR2979614 (B1), Pascal Chretien et al; Filed: Sep. 4, 2011; Published: Mar. 8, 2013 (Direct drive specific to helicopter). FR2979615 (B1), Pascal Chretien et al; Filed:

Sep. 4, 2011; published: Mar. 8, 2013 (Direct drive specific to helicopter, with internal freewheeling system). These patents/applications disclose, at system level, an electromagnetic distributed direct drive used in replacement of conventional mechanical gearboxes. The inherent performance and safety improvements brought by those systems are outlined, in addition to improved resilience to fatigue, as opposed to conventional mechanical gearboxes. The integration into series hybrid architecture is detailed. The laws governing the power distribution across the different motor elements of the transmission leading to an optimized weight budget are described. The resultant weight budget of the distributed drive is subsequently compared with heavier redundant systems. The disclosures do not teach the internal architecture of such drive down to component level, nor do they disclose a possible solution improving the resilience to EMP, EMI, ESD aggressions.

DE 102010021024A1: Jean Botti et al. Filed: May 19, 2010; Published Nov. 24, 2011. This application discloses a direct drive motor used in combination with a flight control system and integrated into a series hybrid topology [0055], [0057]: the electric motor driving the main rotor is gimbaled in such way to tilt the thrust vector in order to achieve attitude (pitch) control. This gimbaled assembly can also be used for active vibration damping [0043], [0054]. The patent also details a tip-driven Electric Ducted Fan (EDF) applied to tail rotor for yaw control. In its principle, the disclosed EDF is identical to the system presented by Dr. Gerald V. Brown of the NASA Glenn Research Center in a report published in May 2004. The motor driving the main rotor is described as a "highly redundant system" [0014], with some power electronics components integrated into the drive itself [0014] [0042] and controlled by an external unit. A clear distinction between the presently claimed invention and the disclosure of DE 102010021024A1 is that DE 102010021024A1 describes redundant motor systems whereas the present invention is a distributed electric motor unit. From English encyclopedia: "In engineering, redundancy is the duplication of critical components or functions of a system with the intention of increasing reliability of the system, usually in the case of a backup or fail-safe. In many safety-critical systems, such as fly-by-wire and hydraulic systems in aircraft, some parts of the control system may be triplicated, which is formally termed triple modular redundancy (TMR). An error in one component may then be out-voted by the other two. In a triply redundant system, the system has three sub components, all three of which must fail before the system fails. Since each one rarely fails, and the sub components are expected to fail independently, the probability of all three failing is calculated to be extremely small; often outweighed by other risk factors, e.g., human error. Redundancy may also be known by the terms "majority voting systems" or "voting logic"". In a redundant system, there is a duplication of particular motor elements with a view to substituting a faulty element with a non-faulty element. This means that the redundant motor system can remain functional even with only one single valid element. That is, each motor element is able to individually produce the total required power. Therefore, it should be understood that a redundant system involves the duplication of critical elements of a system with the intention of increasing the reliability of the system in an effort to make it fail-safe. This involves duplicating or triplicating certain parts within the motor unit so that a number of sub-components must fail before the entire system will fail. In contrast, in the distributed motor unit of the present invention, the sum of the individual powers provided by each discrete motor element is equal to the total required power. That is, the architecture is distributed into a plurality of discrete motor elements for size and weight reasons which are critical considerations in aircraft propulsion. In order to provide redundancy, as provided by the cited prior art, the motor of the present invention would need to be much larger and heavier than it is. Hence, the terms "distributed" and "redundant" are actually mutually exclusive. In a redundant system, one motor unit is sufficient to meet the aircraft's total power requirements, while in the present invention the number of electric motor units including the distributed electric motor unit must be more than two.

DE 10 2010021024A1 details the architecture at system level and does not disclose the internal design of the motor system down to component level, nor does it provide a practical solution addressing the resilience to EMP, EMI, ESD aggressions (the cabling & connections between the external control unit and the motor system present an inherent vulnerability). The absence of resident intelligence imbedded within the motor system and its inability to autonomously manage multiple faults causes the motor system to be completely reliant on the remote control unit for proper operation. Furthermore, the absence of transverse communication between the various power-electronics components integrated into the motor requires that all decisions processes be externally executed by the remote control unit, also. In case of failure of the control unit or loss of communication, the safety of the aircraft would be compromised.

DE102010021025A1: Jean Botti et al. Filed: May 19, 2010; Published Nov. 24, 2011. The application details an electric drive system applied to helicopters and integrated into a series-hybrid topology. The system uses the direct drive motor [0027] introduced in DE 102010021024A1 and discloses a "multiple redundant" [0058] topology, preferably based on transverse flux motor technologies [0060]. The propulsion system is similar to DE 102010021024A1: it does not detail the drive down to component level, nor it addresses EMP, EMI, ESD resilience or the integration of any processing power. Besides, the connections between the external control unit and the motor system present an obvious vulnerability. The safety of the aircraft would be compromised, should the connection between the external control unit and the motor fail.

US20130026304A1: James Wang. Filed: Jul. 27, 2012; Published Jan. 31, 2013. This application discloses the characteristics of an electrically propelled convertiplane, including nacelles tilting mechanism and a novel blade pitch actuator assembly replacing conventional swashplates. A separate motor assembly is associated with each of the rotors. Paragraphs [160], [161] and [0245] teach that the propulsion system is based on a direct drive, and utilizes a two-stack redundant motor assembly [0246] driven by external controllers [0183]. This system of propulsion necessitates a relatively large physical size, because the motor assembly is over-dimensioned for the envisaged redundancy. No particular design addresses EMP, EMI, ESD resilience or fault tolerant architecture other than the redundant motor system. Electric motors are "dumb" motors: the motor controllers and management units are physically distinct systems, interconnected via a plurality of power and signal cables introducing inherent vulnerability to electromagnetic and electrostatic aggressions as well as to any loss of connection.

SUMMARY OF THE INVENTION

The disclosed invention ameliorates the problems inherent in the prior art and outlines the internal architecture down to component level of a fault tolerant distributed direct drive power train comprising an internal meshed optical communication network, or an electrical communication network bringing improved reliability, distributed processing, early fault warning, as well as electromagnetic resilience.

The proposed electromagnetic distributed direct drive is composed of a plurality of stacked motor elements arranged in cylindrical formation; each motor element being directly connected to a common coaxial rotating shaft and including at least one fixed stator driving at least one moving rotor capable of connection to the rotating shaft in order to transmit the mechanical power necessary to produce lift or thrust.

The power distribution across the plurality of motor elements constituting the electromagnetic distributed direct drive is both vertical and radial; that is, along the vertical axis and circumferentially, within each motor element, effectively averaging torque ripple in order to drive helicopter's main rotors at low vibration level.

Each motor element hosts a plurality of multifunction power modules preferably interconnected by an optical meshed network or alternatively by a plurality of electrical connections, forming a fault tolerant self-healing system resulting from the distribution of programs and algorithms embedded in each power module.

Each power module constitutes a network element and comprises one or more programmable integrated circuits such as microcontroller(s) or field-programmable gate array(s), capable of information processing and decision making, along with the power transistor circuitry necessary to energize the stators' windings.

External connectivity between the electromagnetic distributed direct drive and aircraft's flight control systems is preferably achieved via a redundant, free space, optical link that eliminates connectors and cabling altogether.

In another embodiment, external connectivity between the electromagnetic distributed direct drive and aircraft's flight control systems could be achieved via electrical connections such as shielded cables.

By leveraging the distributed processing power resulting from the integration of multiple power modules individually capable of information processing and routing, the electromagnetic distributed direct drive can autonomously perform decision making, including: internal power distribution/power assignment, fault management, self-healing operations, mechanical and electrical health monitoring, as well as mechanical and electrical fault prediction.

The internal processing power reduces the reliance to communications with peripheral systems to maintain the electromagnetic distributed direct drive's functionality.

Consequently, the electromagnetic distributed direct drive is capable of remaining operational, even in the case of degraded onboard communication with the aircraft's main flight control system. The resulting network-based "intelligent" electromagnetic powertrain brings significant safety and performance improvements over legacy mechanical gearboxes and conventional electric topologies used in today's electric propulsion.

According to an aspect of the present invention, there is provided an electromagnetic distributed direct drive unit configured to cause one or more airscrews to rotate by means of at least one shaft to provide lift, propulsion and/or attitude control of an aircraft, the electromagnetic distributed direct drive unit being connected directly to the at least one shaft and comprising a plurality of coaxially mounted motor elements, each motor element connected directly to the at least one shaft and configured to generate a fraction of a total mechanical power required to provide lift, propulsion and/or attitude control of the aircraft, and including at least one fixed stator and at least one rotating rotor, wherein: (a) each motor element includes a plurality of power modules radially disposed about the fixed stator; and (b) each power module comprises one or more programmable integrated circuit such as microcontroller(s) or field-programmable gate array(s), capable of information processing and decision making which interface with the associated circuitry, a power transistor switching circuitry for energizing the at least one stator's windings and a dedicated DC filtering circuitry that can comprise transient suppressors; wherein the power modules are individually programmed and configured to operate as interconnected network elements belonging to a network to enable fault tolerant distributed processing.

The external connectivity between the electromagnetic distributed direct drive and an aircraft flight control system may be provided by means of optical link. The optical link can be a redundant free space optical link.

According to an embodiment, internal network elements are interconnected through an optical network. The internal network elements may be in the form of power modules.

In an alternative embodiment, internal network elements in the form of power modules are interconnected through an electrical network.

External connectivity between the electromagnetic distributed direct drive and an aircraft flight control system may also be provided by means of electrical connections.

Internal and external data communications may be achieved via a multipath meshed optical network. In a particular form of the invention, the multipath meshed optical network includes an optical feed comprising at least one optical waveguide and a plurality of associated optical splitters. The multipath meshed optical network may include an optical feed comprising at least one optical waveguide and a first end of the optical feed points towards a distant electro-optical interface enabling data communication with the aircraft flight control system via the free space optical link; and a second end of the optical feed interfaces with optically driven pitch actuators controlling the angle of incidence of a plurality of blades constituting the airscrew.

The multipath meshed optical network may further include:

(a) at least one optical coupler enabling the distribution of light signal to the plurality of power modules; and (b) a plurality of lenses, optical fiber assemblies, or mirrors assemblies, integrated within the rotor.

In one embodiment, the free space optical link is established via at least one optical feed between and an array of laser diodes or LED's and one or more light sensing devices connected to a redundant multi-channel electro-optical interface.

According to an embodiment, data communication between the power modules and/or external systems may be based on Transmission Control Protocol/Internet Protocol and may use one or more of the following data access schemes:

(a) Time Division Multiple Access;
(b) Code Division Multiple Access;
(c) Orthogonal Frequency Division Multiplexing; and/or
(d) Frequency and/or phase shift keying of multiple subcarriers.

In some forms of the invention, a sub network is created to provide data communication between the power modules or between external systems such as the aircraft flight control system, wherein creation of the sub-network is achieved by wavelength division multiplexing.

A power transistor circuitry may be integrated into each power module to drive and associated stator's windings and a switching sequence of the power transistor circuitry involves one or more of the following:

(a) angular sensing of each rotor by one by one;

(b) equipping each power module with at least one optical resolver unit including a transmitter/receiver assembly and sending one or more light beams to an optical encoder mounted onto the rotor to derive the rotor's angular position from the reflected signals;

(c) equipping each power module with one or more magnetic resolvers detecting the magnetic field variation produced by the magnet assembly installed onto each rotor; and/or (d) using sensorless function, where current and/or voltage variations in the stator's windings are used to derive the angular position of the rotor.

According to an embodiment, each power module broadcasts its own angular positioning information to the plurality of power modules driving the same rotor to enable identification of one or more power modules affected by faulty angular resolver.

DC power may be fed to the motor elements by a fault tolerant multipath energy distribution network.

In some embodiments, protection circuits are integrated into at least one power module and inserted in a DC line, each protection circuit including: a filtering circuitry in the form of a multipole filter; a transient protection to provide electromagnetic pulse protection; and an electrostatic discharge protection system.

Each motor element may have a metallic casing to act as a shield against the magnetic and electric components of radio waves.

In some embodiments, each power module is protected by a Radio Frequency shield protecting each power module, in the form of lightweight metal and/or conductive or dissipative polymer.

Regenerative breaking may be enabled by conversion of the energy produced by the airscrew during aggressive or aerobatic maneuvers into electrical current fed into a bank of battery, and/or a bank of super capacitors, and/or a resistive load in order to prevent over speeding of the airscrew(s).

According to some embodiments, each rotor transmits mechanical power to the shaft via a mechanical or electromagnetic freewheeling unit.

The electromagnetic distributed direct drive may include a plurality of motor elements rotating at constant or variable speed, wherein each a configuration of each motor element based on one or more of the following topologies: axial flux, radial flux, parallel path motor technology, or transverse flux.

The electromagnetic distributed direct drive may be integrated into a series hybrid topology or full electric topology and where the power modules and their power switching circuitry are used as an inverter to recharge the propulsion battery pack.

The distributed processing provided by the one or more microcontrollers and/or field-programmable gate arrays in each power module may enables one or more of the following:

(a) autonomous self-healing capability including fault detection and reconfiguration of remaining viable power modules in the event of degraded or lost communication with the flight control system;

(b) interpretation of pilot inputs by detecting torque on the main shaft and triggering a sequence of power settings corresponding to predefined flight patterns;

(c) early failure warning of the power switching circuitry integrated into each power module; and/or (d) early warning of mechanical failure through real-time analysis of the vibration spectrum generated by the bearing assemblies.

Early failure warning of the power switching circuitry may be provided by monitoring precursors of power transistor failure, including real-time measurement of static and dynamic parameters and comparing the same to baseline parameters measured in a healthy device, where a predefined magnitude and/or rate of divergence between the measured parameters and baseline parameters triggers an early failure warning.

The vibration spectrum may be measured by a plurality of sensors installed in a vicinity of each bearing assembly, wherein the rate and/or magnitude of divergence from a baseline parameter measured in a healthy device triggers a mechanical failure alarm.

BRIEF DESCRIPTION OF THE FIGURES

The various features and advantages of this invention will become apparent to those skilled in the art from the following detailed description of the disclosed non-limiting embodiment. The drawings that accompany the detailed description can be briefly described as follows:

FIG. 20 shows an extension of the optical feed up to the rotor head of a helicopter (or a propeller) for flight controls and thrust control.

FIG. 21 shows an exemplary power supply architecture of a two stack electromagnetic distributed direct drive.

DETAILED DESCRIPTION

The term "aircraft" as used herein, is intended to encompass various flying craft including fixed-wing aircraft, rotary-wing aircraft (including single and multiple rotors), flapping-wing aircraft and other airborne vehicles of various scales.

The term "airscrew" as used herein is intended to encompass various types of rotors and propellers that convert rotary motion from a motor to provide a propulsive force.

Figure 1A:
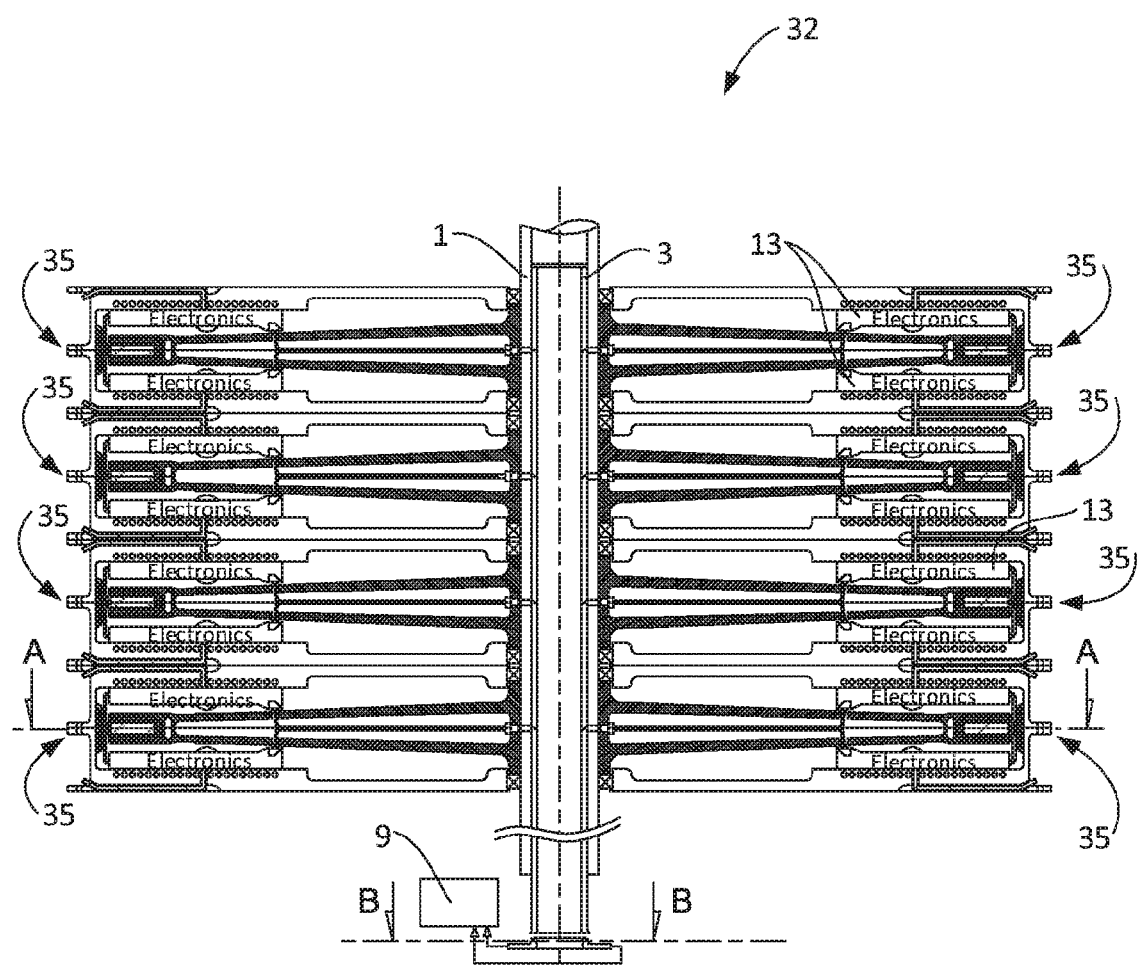
FIG. 1A is a cross section through an exemplary four stack axial flux electromagnetic distributed direct drive having optical transmission units. Other configurations are possible, ranging from two stacks to eight or more, depending on the application and system.
Figure 1B:
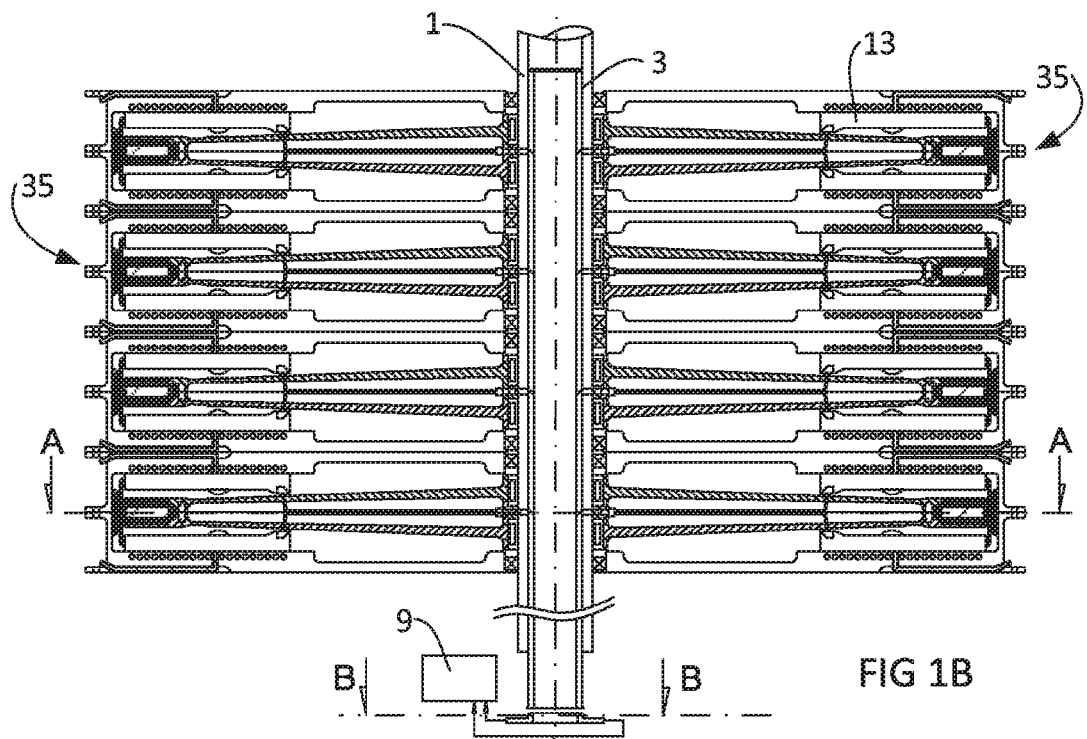
FIG. 1B is a cross section through an alternate four stack axial flux electromagnetic distributed direct drive wherein mechanical power is transmitted to the shaft via a freewheeling unit.
Figure 14A:
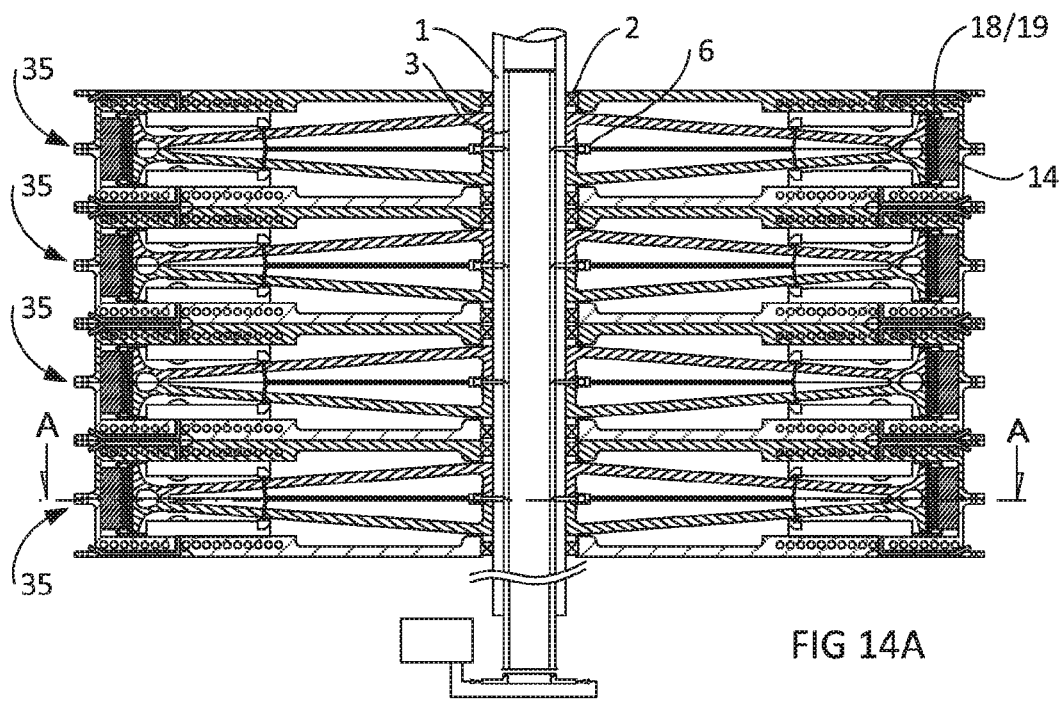
FIG. 14A is a cross section through a radial flux electromagnetic distributed direct drive having optical transmission units.
Figure 14B:
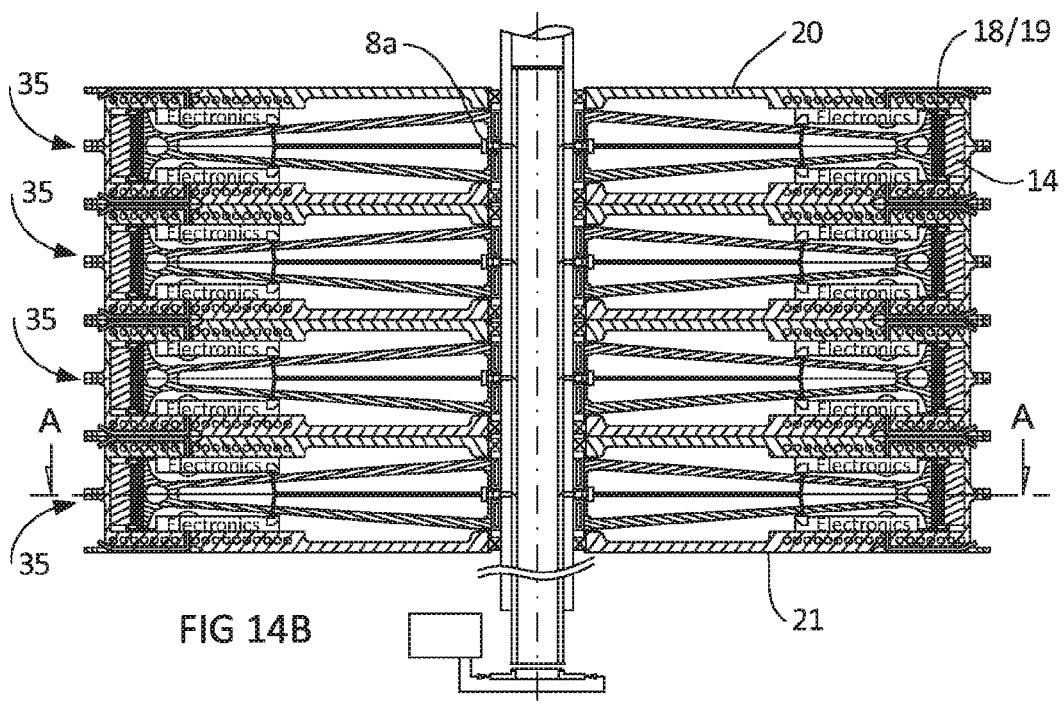
FIG. 14B is a cross section through a radial flux electromagnetic distributed direct drive wherein mechanical power is transmitted to the shaft via a freewheeling unit FIG. 15A a top view of a cross section in the rotor plane of the radial flux electromagnetic distributed direct drive of FIG. 14A.

Referring to FIGS. 1A and 1B, the axial flux electromagnetic distributed direct drive [32] is composed of a stack of motor elements [35]. Conversely, FIGS. 14A and 14B depict an electromagnetic distributed direct drive [32] is composed of a stack of motor elements [35]. Each motor element [35] is connected to the shaft [1] to cause one or more airscrews [29] to rotate (see FIG. 20).

Figure 2A:
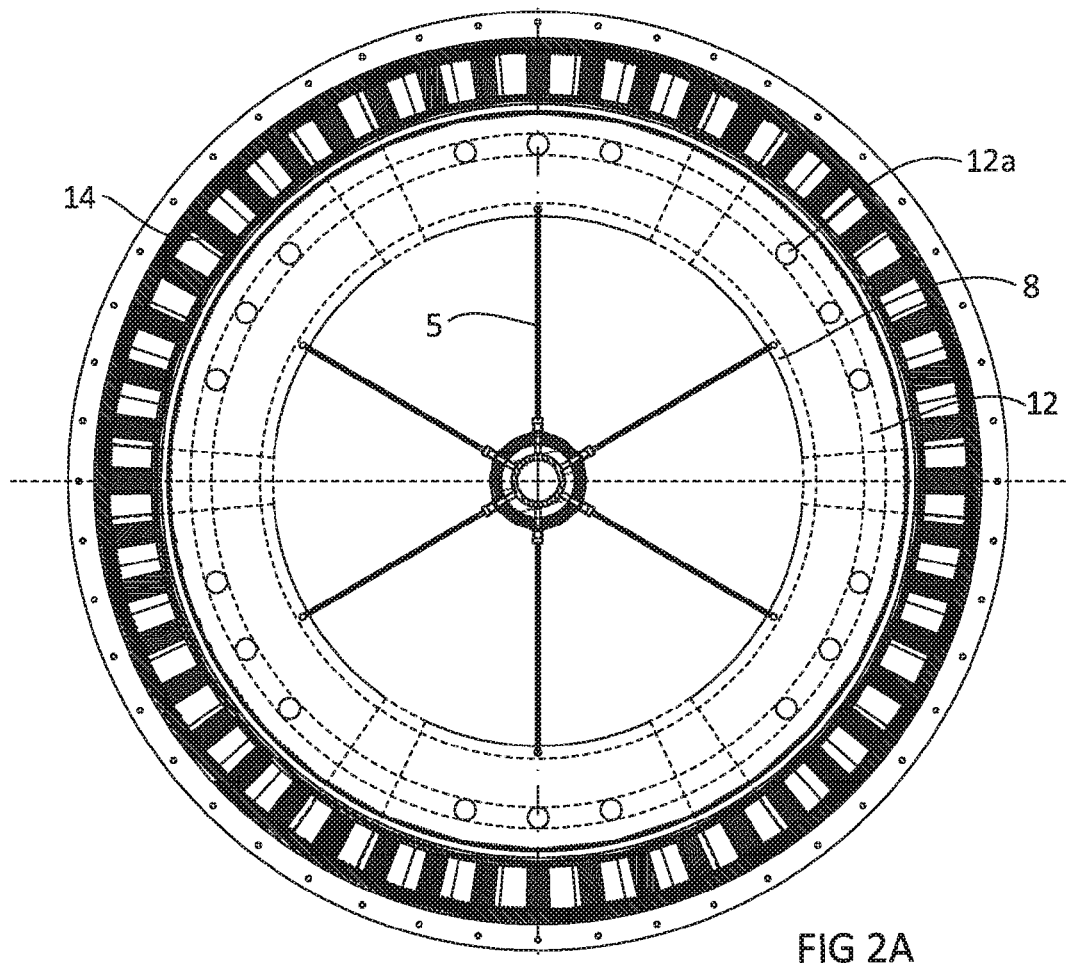
FIG. 2A is a top view of a cross section in the rotor plane, through the electromagnetic distributed direct drive according to the embodiment shown in FIG. 1A.
Figure 2B:
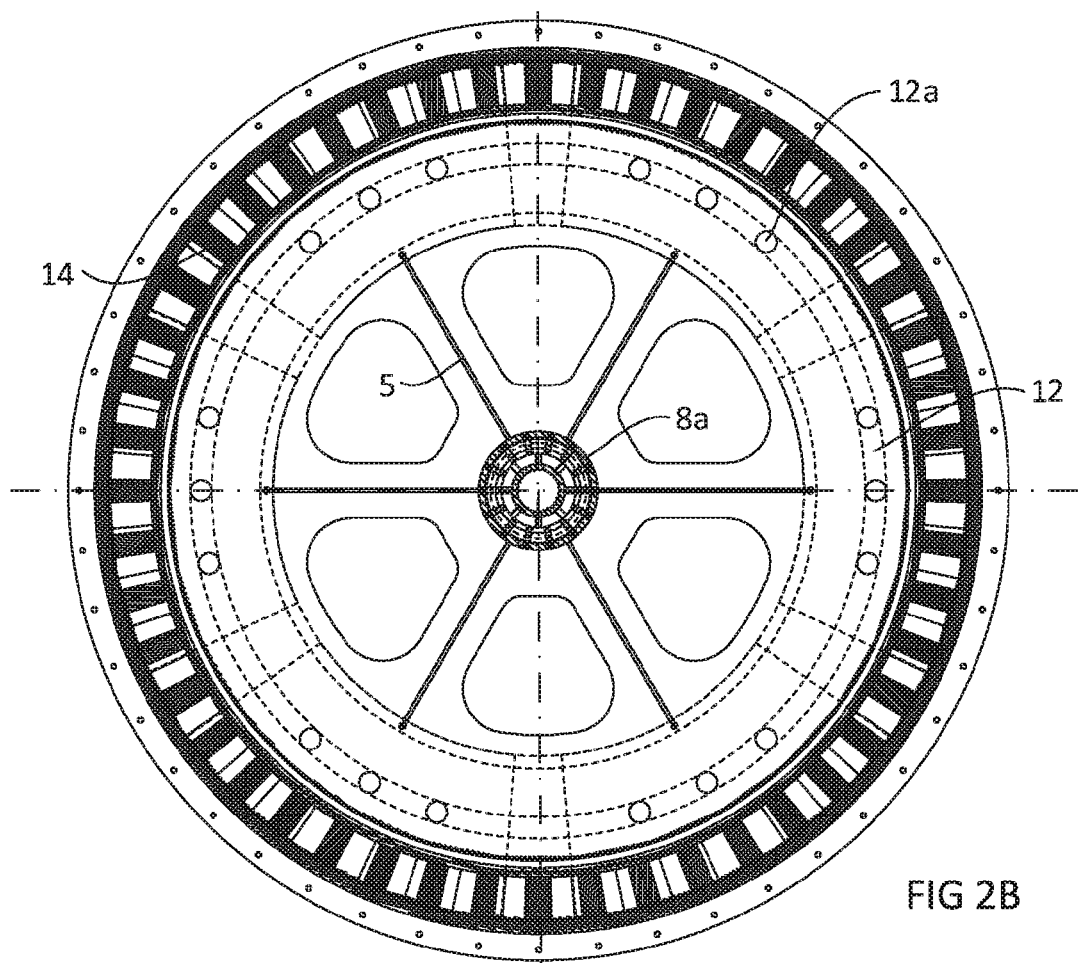
FIG. 2B is a top view of a cross section in the rotor plane through the electromagnetic distributed direct drive according to the embodiment shown in FIG. 1B.
Figure 15A:
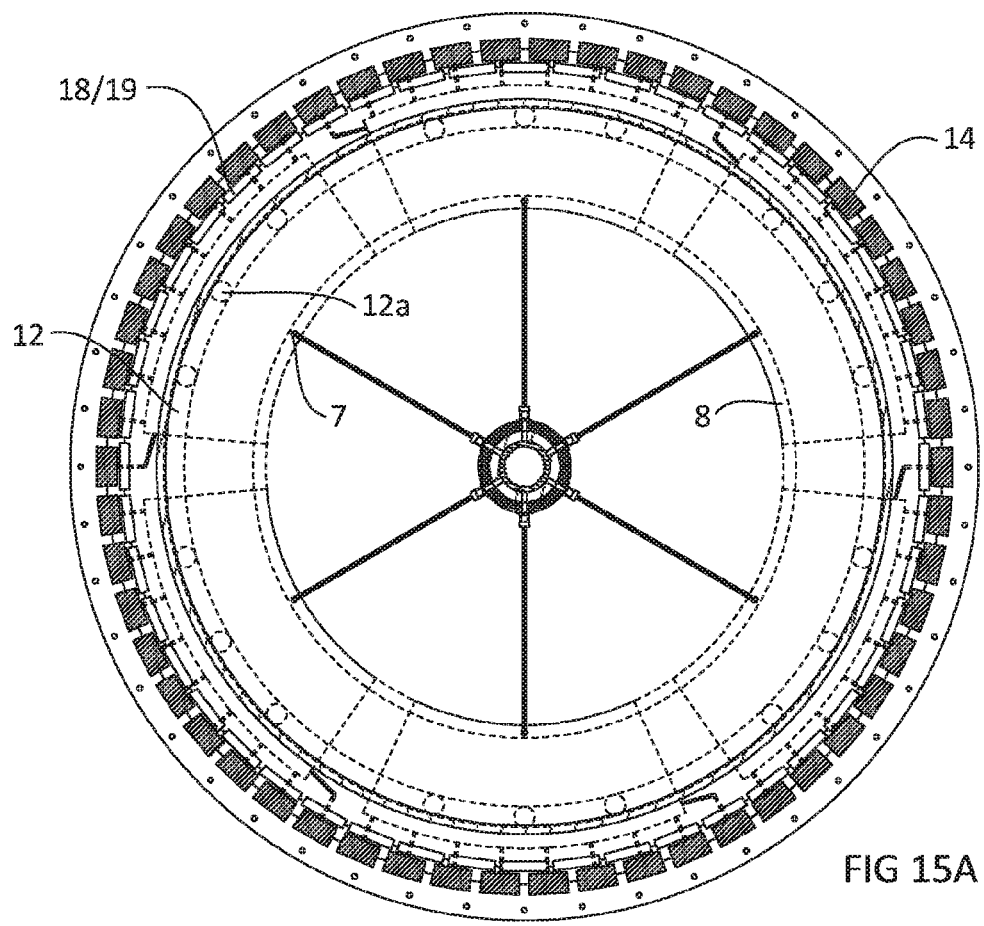
FIG. 15B a top view of a cross section in the rotor plane of the radial flux electromagnetic distributed direct drive of FIG. 14B with freewheeling unit.
Figure 15B:
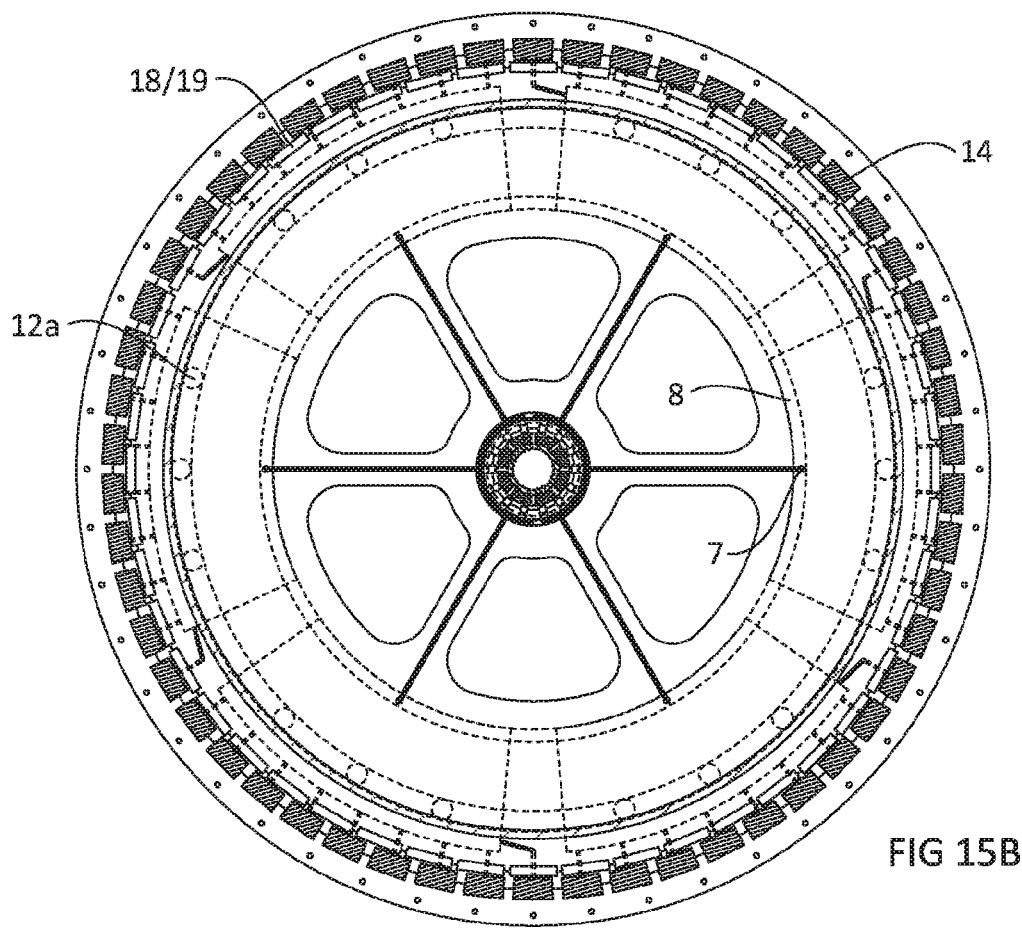
Figure 16A:
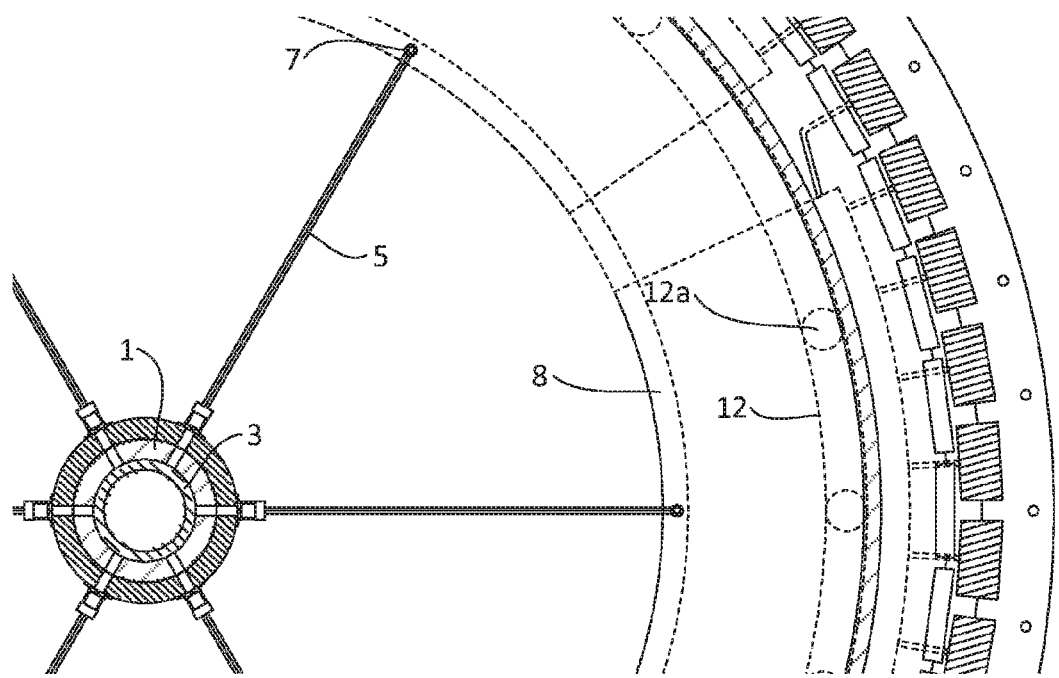
FIG. 16A is a top view of a cross section in the rotor plane showing an optical arrangement of the radial flux electromagnetic distributed direct drive of FIGS. 14A and 15A.

Referring now to FIGS. 2A and 2B, there are shown top views of cross sections through an axial flux electromagnetic distributed direct drives of FIGS. 1A and 1B respectively. Conversely, FIGS. 15A and 15B depict the top views of the cross sections through a radial flux electromagnetic distributed direct drives of FIGS. 14A and 14B respectively. Each power module [13] drives a plurality of stator windings [14], and is also fitted with angular resolver assemblies such as [12], [12a] to enable correct sequencing of the stator's winding [14].

Figure 3A:
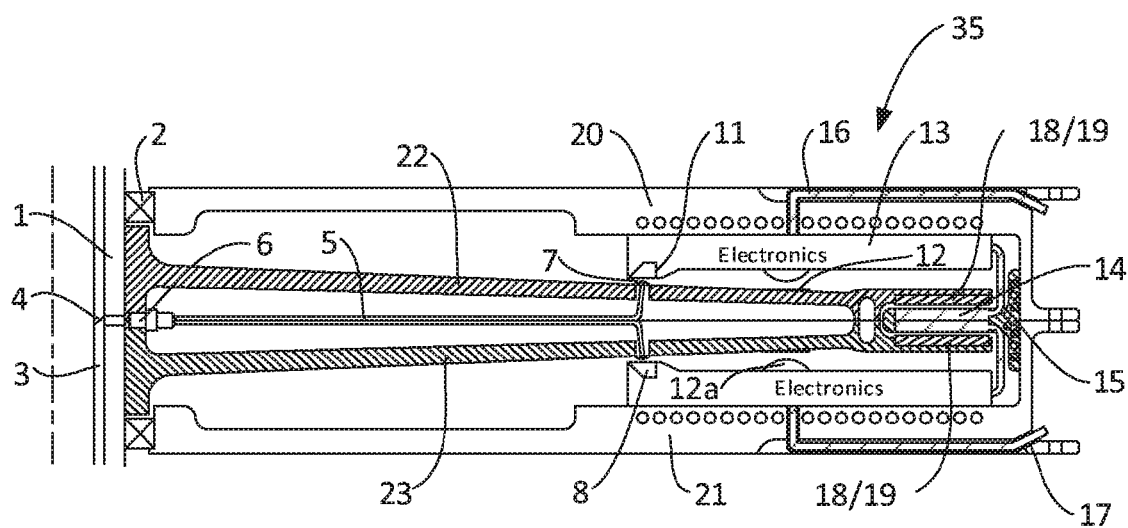
FIG. 3A is a detailed side view of one motor element of an axial flux electromagnetic distributed direct drive according to the embodiment shown in FIGS. 1A and 2A.
Figure 3B:
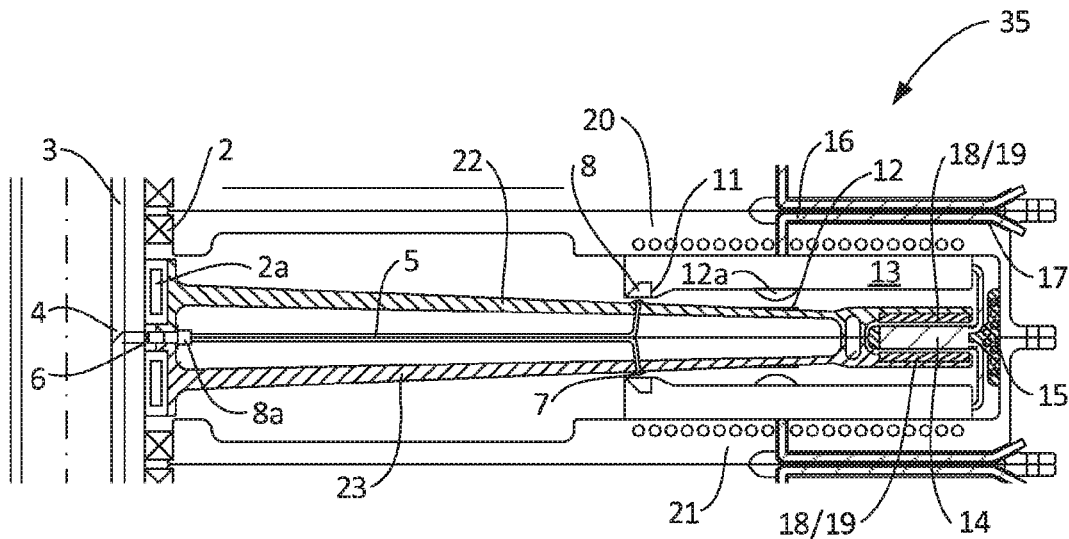
FIG. 3B is a detailed side view of one motor element of an axial flux electromagnetic distributed direct drive according to the embodiment shown in FIGS. 1B and 2B.
Figure 17A:
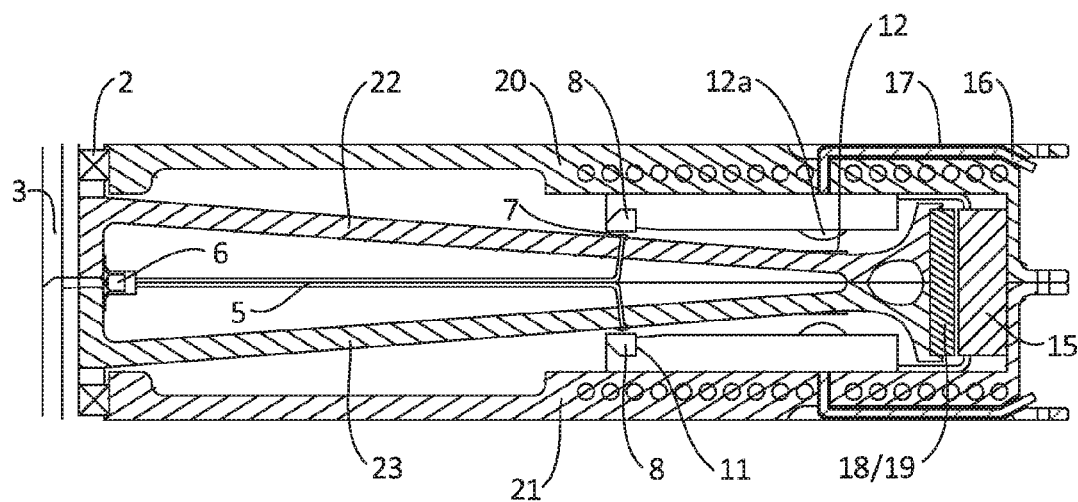
FIG. 17A is a detailed side view of the radial flux electromagnetic distributed direct drive FIGS. 14A, 15A and 16A with optical communication apparatus.
Figure 16B:
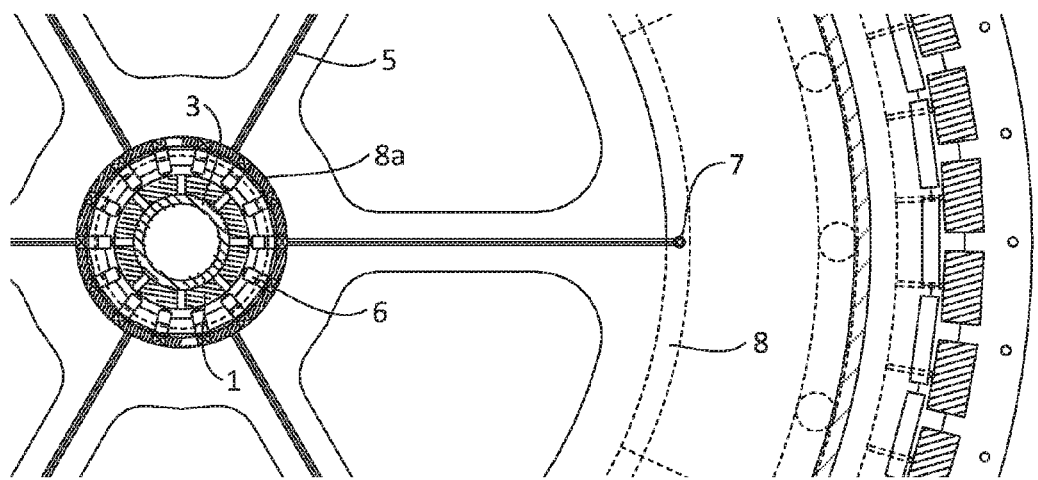
FIG. 16B is a top view of a cross section in the rotor plane showing an optical arrangement of the radial flux electromagnetic distributed direct drive with freewheeling unit of FIGS. 14B and 15B.
Figure 17B:
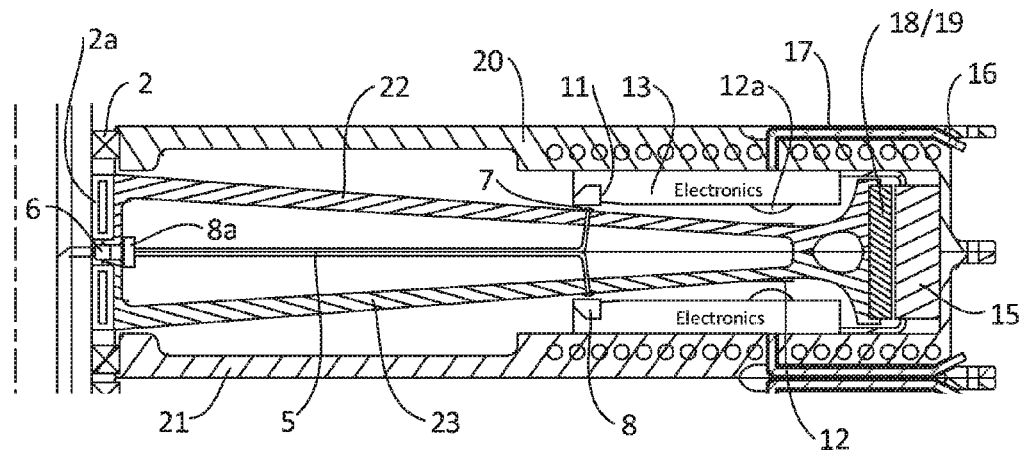
FIG. 17B is a detailed side view of the radial flux electromagnetic distributed direct drive wherein mechanical power is transmitted to the shaft via a freewheeling unit FIGS. 14B, 15B and 16B.

Referring now to FIGS. 3A and 3B which show an enlarged view of an axial flux motor element [35]. Conversely, FIGS. 17A and 17B show an enlarged view of a radial flux motor element [35]. Each motor element hosts at least one fix stator assembly [14], [15] driving one at least one moving rotor [22] & [23] equipped with magnet assemblies [18] or [19]. Each motor element housing assembly [20] & [21] can be fitted with built-in cooling pipes (as required). The fix stators include a plurality of windings [14], restrained by a dedicated frame [15] equipped with the circulation pipes (as) necessary for cooling of the winding assembly. In another embodiment of the invention, forced air cooling may be used, for example, in the case of low to middle power electromagnetic distributed direct drives, such as tail rotor drives used in helicopters. The stator assemblies [14], [15] associated with the motor elements [35] are fed by a plurality of radially disposed RF shielded power modules [13]. Each power module [13] drives a plurality of stator windings [14] and is located underneath or adjacent to the winding assembly in order to eliminate bus bars, thereby eliminating conducted and radiated electromagnetic emissions as well as eliminating conducted and radiated susceptibility. Significant weight savings can be achieved by eliminating copper cables.

Each rotor assembly [22] & [23] holds a plurality of permanent magnets [18] or [19]. The main shaft [1] is coaxial with the plurality of rotor assemblies [22] & [23]. In the embodiment shown in FIGS. 3A and 17A, each rotor assembly [22] & [23] is directly connected to the main shaft [1] it is driving. In the embodiment shown in FIGS. 3B and 17B, each rotor assembly [22] and [23] drives a dedicated freewheeling unit [2a] connected to the main shaft [1]. The freewheeling unit [2a] may be of mechanical or electromagnetic type.

Vertical power distribution is achieved by the plurality of stacked motor elements [35], whereas radial power distribution is achieved through the plurality of power modules [13] hosted by each motor element [35].

Each power module [13] hosts the power transistors circuitry required to drive the plurality of associated windings [14], as well as analog to digital converters, optical communication interfaces [11] and one or more processor(s), preferably in the form of microcontroller(s) and/or field-programmable gate array (FPGA). In addition to managing the switching sequence of the power transistor circuitry, the microcontrollers enable signal processing (such as Fast Fourier Transform), system management, electrical and mechanical fault prediction, external communication with aircraft's flight computer, as well as internal communication. The interconnection between power modules is organized in such way to achieve distributed processing and self-healing capability.

Additionally, each power module [13] is equipped with its own built-in DC line-filtering unit, fitted with a transient suppressor and is individually supplied with DC power via a set of insulated bus bars [16]. Power modules are also fitted with angular resolver assemblies such as [12], [12a] enabling proper sequencing of the stator's winding [14].

Referring now to FIGS. 1A, 1B, 14A, 14B, 2A, 2B, 15A, 15B, 3A, 3B, 17A, 17B, 3B, 3C, 3D, 4A, 4B, 16A, 16B, in one embodiment, the plurality of power modules are interconnected via a fault tolerant meshed optical communication system including an optical feed [3], optical splitters [4], optical fibers [5] or inner prismatic reflectors [12c], lens assemblies [6], [7], inner ring type optical coupler [8a], as well as outer fix ring-type optical couplers [8], which altogether enable inter-stage & inter-module data transfer, as well as external communication with the aircraft's flight control computer through an external multichannel electro-optical transceiver unit [9].

Given that the torque produced by an axial flux electric machine is proportional to the cube of its diameter, axial flux topologies as depicted in FIGS. 1A, 1B, 2A, 2B, 3A, 3B, 3C, 3D, 4A, 4B, 6A, and 6B, are preferably used to drive the main rotor of helicopters as well as open rotors, due to their ability to produce high torque at low speed. Open rotors are large diameter multi-bladed airscrews used on some large size fix wing aircrafts.

Given that the torque produced by a radial flux electric machine is proportional to the square of its diameter multiplied by its length, radial flux topologies as depicted in FIGS. 14A, 14B, 15A, 15B, 16A, 16B, 17A, 17B, 18A, 18B, are preferably utilized for the propulsion of fix wing aircrafts due to their appropriate form factor and weight when driving conventional propellers at speeds around 2500 RPM. In a particular embodiment of the invention, other electromagnetic topology such as PPMT (Parallel Path Motor Technologies) can also be used.

Other electromagnetic topologies, such as transverse flux, may be used (although transverse flux systems incur significant losses when rotational speed is increased and are only practical for helicopter drives that operate at low speed).

Unlike common electric machines that utilize grain oriented iron laminations or Soft Magnetic Composites (SMC) to constitute the stator's magnetic circuits, the disclosed invention may preferably utilize ironless architectures in some applications such as a helicopter drive, in order to eliminate iron losses and cogging torque altogether. The cogging torque is the alternating torque necessary to overcome the effect of the magnetic attraction between the rotor's permanent magnets and the stator's iron poles, as the moving magnets are passing by the ferromagnetic core material. The average value of this resistant torque is never equal to zero as a result of iron losses within the ferromagnetic materials. The resulting breaking torque can slow down the main rotor of a helicopter during autorotation, leading to possible loss of control.

It will be apparent to those skilled in the art that ironless topologies can lead to significant structural weight savings, especially when implemented in axial flux topologies. The static mechanical forces resulting from the magnetic attraction between the stator's iron cores and the rotor's permanent magnets induce significant bending moments within the rotor's structure. As a result, stiff and heavy structures are normally required in order to maintain a constant air gap between magnets and stator. By removing the iron core from the stator's windings, considerably lighter rotor and stator structures can be produced, this type of architecture is ideally suited to large diameter axial flux electric machines used to drive the main rotor of helicopters.

Iron lamination or SMC saturate in the vicinity of 2.5 Tesla. This figure is currently acceptable, considering that today's best rare earth magnets are capable of producing magnetic fields in the order of 1.5 Tesla. However experimental magnets up to 4 Tesla are currently being developed in the labs and once industrialized those high performance magnets will be incompatible with common iron core materials. By contrast, the preferred ironless topology ensures seamless migration towards advanced magnets without requiring a complete redesign of the motor's architecture.

Referring back to FIGS. 3A, 3B, 17A and 17B, Hallbach arrays of magnets [18], or other types of magnet assemblies [19] are circumferentially installed on each rotor [22], [23]. Permanent magnets are preferably organized in Hallbach arrays [18] that present the particularity of concentrating magnetic flux on one side of each array, hence achieving better torque performance. In the axial flux topology depicted in FIGS. 1A, 1B, 2A, 2B, 3A, 3B, 3C, 3D, 4A and 4B, the rotor assemblies [22], [23] may carry two back to back Hallbach arrays per rotor in order to increase torque density. FIGS. 1A, 1B, 2A, 2B, 14A, 14B, 15A and 15B detail permanent magnet (PM) based motor elements. In order to achieve an optimal power to weight ratio, the electromagnetic distributed direct drive preferably utilizes high performance permanent magnets such as rare earth NdFeB. Switched reluctance systems are presently too heavy to be practical for an aircraft environment.

Motor elements integrated in the electromagnetic distributed direct drive applied to helicopter drives require a high number of poles (100 or more) for smooth operation and high torque production, although the example given in FIGS. 1A, 1B, 2A, 2B depicts a 48 pole configuration for ease of representation.

In a preferred embodiment of the invention, stator's windings [14] utilize Litz wire bundles in order to reduce eddy current losses in the copper wires.

Stator windings may include thermal protection devices (e.g. thermal fuses), preventing fire in the case of a dead short accidentally developing in the power module(s) circuitry [13], or within the winding assembly [14]. Power transistors (such as IGBT or MOSFET) commonly utilized to drive stator's windings usually fail in dead short. Windings can also fail in short circuit (winding insulation failure). Without the thermal protections, both failure modes can result in extremely high induced currents if the failure occurs during flight (rotors turning) and are capable of triggering electric fire in the faulty unit, as well as causing severe inductive breaking torque, potentially slowing down the main rotor of a helicopter. Given that the magnetic flux produced by permanent magnets assemblies cannot be switched off, freewheeling units and thermal protections are advantageous for disengaging and mechanically isolating the faulty power module(s) and/or stators.

In the embodiment shown in FIGS. 1B, 14B, 2B, 15B, 3B, 17B, 3C, 4B, and 16B during normal operation, electromagnetic or mechanical freewheeling units [2a] continuously transmit the torque generated by the rotor assemblies [22] & [23] to the main shaft [1], whilst ensuring mechanical decoupling of a damaged motor element in the event of a multiple short circuits accidentally developing in several power module(s) circuitries [13] or within several winding assemblies [14]. Additionally, each power module and winding can include individual thermal protection (e.g. thermal fuse), insuring that only one faulty power module does not bring down a complete motor element.

The disclosed distributed drive of both embodiments uses a higher number of motor elements than redundant systems, resulting in considerably reduced torque ripple on the common shaft [1], hence lowered fatigue levels in the rotor head [28] and blade roots of rotor blades or propeller [29].

Each motor element hosts a plurality of RF shielded power modules [13]. FIGS. 1A, 1B, 2A, 2B, 3A, 3B, 3C, 3D, 4B, 4A, 14A, 14B, 15A, 15B, 16A, 16B, 17A and 17B show that power modules [13] are radially mounted inside each motor element, on both side of each rotor assembly [22], [23].

Figure 13:
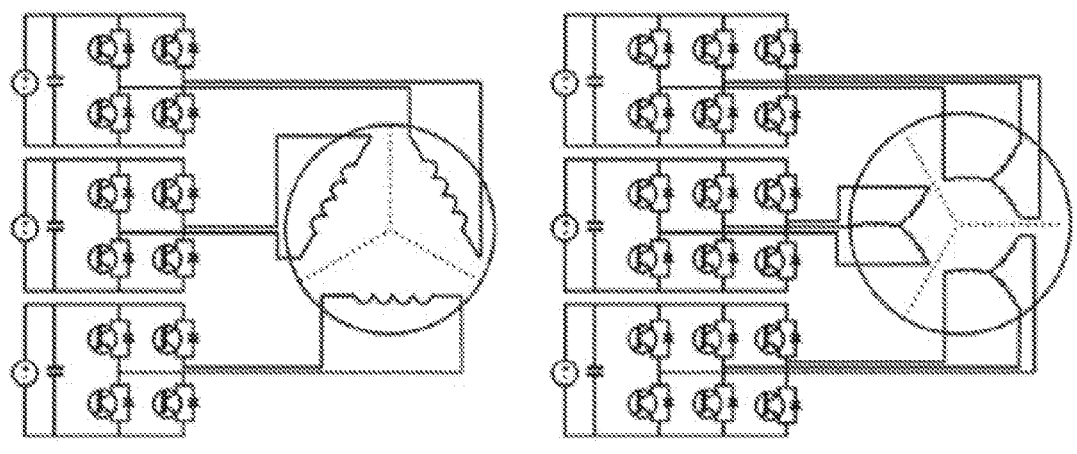
FIG. 13 shows a transistor circuitry and winding wiring with supply of independent windings shown to the left and supply of independent multiphase windings shown to the right.

Power switching circuitry, required to drive several windings [14], includes arrays of power transistors, such as H-bridge. Power transistors are preferably of IGBT or MOSFETS types. Windings [14] may be connected in a conventional manner (i.e. 3 or 6 phases, in wye or delta configuration), however, in a preferred fault tolerant embodiment of the invention shown in FIG. 13, each stator winding (FIG. 13L), or stator winding assembly (FIG. 13R) is individually fed by a dedicated H-Bridge array associated with its own control circuitry. The H-Bridge array being capable of discrete timing adjustments, with the advantage of minimizing torque ripple, vibrations and mechanical fatigue; furthermore, independent timing is capable of maintaining safe operation during degraded mode, i.e. when one or several windings are inoperative (e.g. in the case of damage resulting from ballistic impacts). Due to the high number of poles constituting each motor element, a plurality of power modules [13] is required.

Power modules [13] are directly adjacent to the stator's windings [14] they are driving, subsequently eliminating bus bars and resultant electromagnetic emissions/electromagnetic susceptibility problems. In the four stack axial flux example depicted in FIGS. 1A, 2A, 1B, 2B, twelve power modules [13] per motor element [35] (six power modules on each side of the rotor) are used to drive a total of forty eight windings.

The power switching circuitry and its associated control circuits may be configured in such way to enable regenerative breaking in order to provide active rotational speed control preventing the main rotor of a helicopter, or the propeller of a fix wing aircraft from overspeeding during aggressive maneuvers (high load factor maneuvers). The electric power generated during breaking operation may be dumped into the battery pack of a series hybrid system, or in a bank of supercapacitors, or in a dummy load. This functionality does not arise in those embodiments, wherein the electromagnetic distributed direct drive uses freewheeling units.

Additionally, the power switching circuitry and its associated controller may be configured into a battery charger and or as an AC heating unit to control battery temperature when the electromagnetic distributed direct drive is integrated into series hybrid, or full electric topologies. In this configuration, the power modules are fitted with an additional port enabling the connection to an external power source (external ground charger, or Auxiliary Power Unit) in order to charge the battery pack when the aircraft is parked. The power switching circuitry may also be used to create and circulate an AC current through the battery pack subsequently causing battery heating, when operating in sub-zero conditions.

One or more angular position resolvers can be provided with associated circuitry. The purpose of this subsystem is to provide accurate real-time angular position sensing of each rotor, enabling the appropriate sequencing of the power switching circuitry driving each stator's windings. In a preferred embodiment of the invention, optical resolver assemblies [12, and 12a] as depicted in FIGS. 1A, 1B, 2A, 2B, 3A, 3B, 3C, 3D, 4A, 4B, 6A, 5, 14A, 14B, 15A, 15B, 16A, 16B, 17A and 17B are used. Behind each focusing lens [12a] is installed one or several Light Emitting Diode (LED) and one or several photodiode. The photodiode(s) being capable of receiving the light signals emitted by the LED and reflected by a distant target [12]. Each lens assembly [12a] aims towards rim-shaped coded reflecting targets [12] installed on both sides of each rotor assembly [22] and [23] in order to provide, to the power module [13] it is part of, precise angular positioning of the rotor assembly [22] and [23].

Angular positioning information generated by the optical encoders [12a] is also utilized to elaborate power sequencing between different motor elements during the starting phase of the electromagnetic distributed direct drive, in order to prevent inter-stage timing conflicts.

In the embodiment shown in FIGS. 1B, 14B, 2B, 15B, 3B,17B, 3C, 4B and 16B, 18B the freewheeling units [2a] decorrelate the relative angular position between different rotors assemblies [22], [23]. This loss of angular synchronization between different rotor assemblies requires dedicated position sensing for each rotor, i.e. each group of power modules connected to the stator windings driving a given rotor assembly [22], [23] must be individually equipped with its own resolver assemblies.

Each power module may use several optical resolver units for redundancy. FIGS. 2A, 15A, 2B, 15B, 4A, 16A, 4B and 16B depict a triple redundant sensor configuration, where three LED/photodiode/lens [12a] assemblies are integrated into each power module [13], although other configurations with different number of position sensors are possible. The actual rotor position (calculated by the microcontroller unit integrated into each power module) is derived from signals generated by the plurality of position sensors. The absolute rotor position is calculated by taking into consideration the angular position offset of each sensor.

The electromagnetic distributed direct drive shown in FIGS. 1A, 1B, 2A, 2B, 3A, 3B, 3C, 3D, 4A, 4B, 5, 6A, 6B, and 14A, 14B, 15A, 15B, 16A, 16B, 17A, 17B utilizes optical encoders to resolve rotor's angular position. However, in another embodiment of the invention, other means of angular sensing may be used, such as Hall Effect magnetic sensors capable of accurately detecting the position of the magnets assemblies [18] or [19]. Yet, another mean of position sensing is based on "sensorless" techniques where the rotor's angular position is derived from the measurement of current and voltage variation in the stator's windings [14].

Those different means of angular measurement can be used independently, or in combination of each other.

In addition to the disclosed sensing features, an integrity monitoring system is capable of maintaining functional one or several power module(s) [13] affected by positioning sensor fault(s). The angular positioning information collected by each power module [13] belonging to a given motor element [35] is broadcasted to all the power modules hosted by this motor element. This functionality is made possible by a dedicated data channel encapsulated into the main data stream aggregate carried by a meshed optical data transmission network or electrical connections between the power modules. Conversely, any power module [13] belonging to a given motor element [35] receives, from all the other power modules hosted by this motor element, correlated angular positioning information related to the driven rotor(s) assembly [22], [23]. Each positioning data afferent to a given power module is corrected by the angular offset inherent to the radial position of the power module it originates from. Once corrected, those positioning data are overlaid and matched by the processor unit integrated within each power module [13]. Integrity monitoring algorithms resident in each power module enable outvoting any angular discrepancies pointing to a faulty resolver unit. By regenerating the appropriate switching sequence, from the positioning information collected by peripheral power modules, this functionality enables the power switching circuitry of a power module affected by multiple sensor faults to remain functional. This functionality is applied, regardless of the angular sensing technique utilized. The advantage of this technique becomes apparent when several resolvers are faulty, where only one valid power module is capable of synchronizing the switching circuitries of all the power modules driving a given rotor assembly. FIGS. 1A, 1B, 2A, 2B, 14A, 14B, 15A and 15B show that the power modules may be evenly distributed in the motor element, on each side of the rotor assembly [22], [23]; the power modules located on one side of a rotor assembly can provide switching sequencing to the plurality of power modules installed on the other side of the rotor. This feature is particularly effective when all the sensors located on one side of the rotor are damaged by foreign object ingress, ballistic impact or fire.

Figure 11:
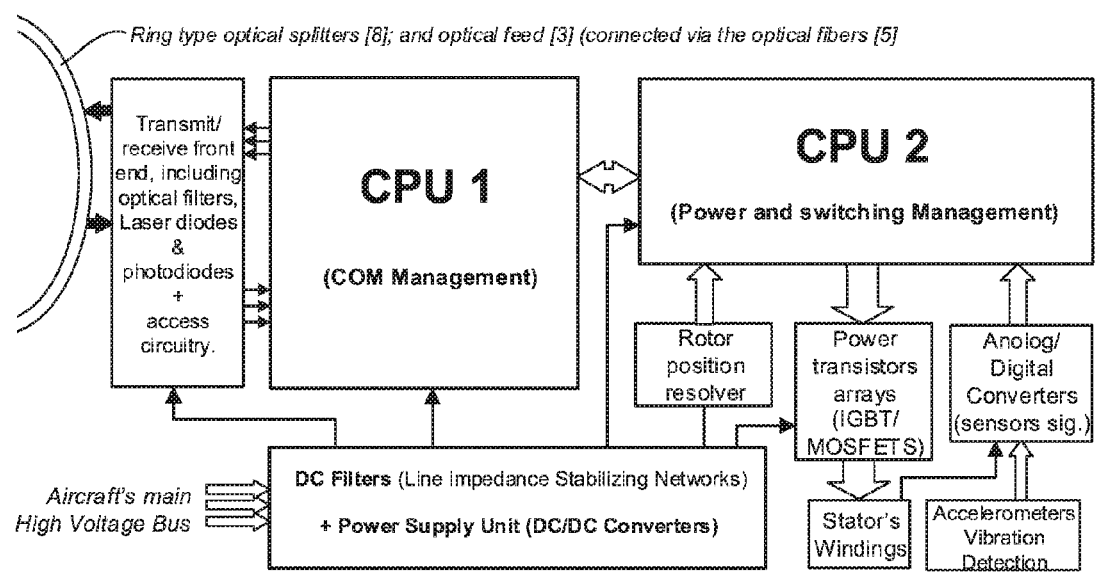
FIG. 11 is a power module block diagram depicting the different processors and peripheral components.
Figure 22:
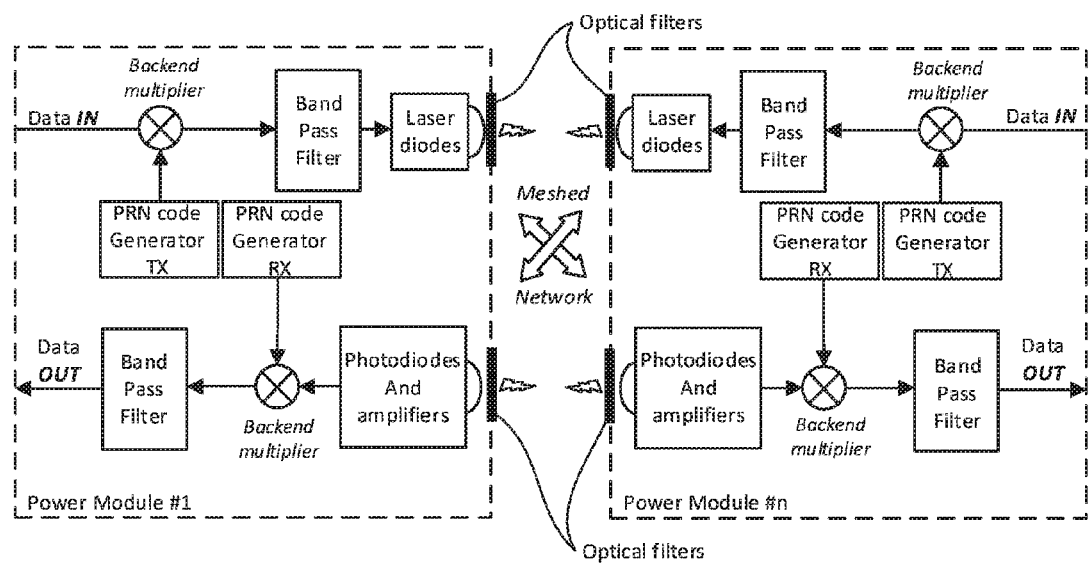
FIG. 22 is a block diagram showing a power module's optical interface using code division multiple access mode (also shown as "Transmit/receive front end, including optical filters, Laser diodes & photodiodes+access circuitry" in FIG. 11.)

In some embodiments, each power module [13] communicates with the surrounding power modules, as well as with the aircraft's computer systems, via its built-in redundant optical transceiver interface [11] that includes Laser (or LED) diodes & photodiodes assemblies, optical filters and front end circuitry (amplifiers, mixers, commutations devices and access mode management, as depicted in FIGS. 11 and 22). Each optical transceiver interface [11] may include redundant sets of Laser (or LED) diodes and photodiodes arrays, where active components are duplicated or triplicated for reliability.

Figure 9:
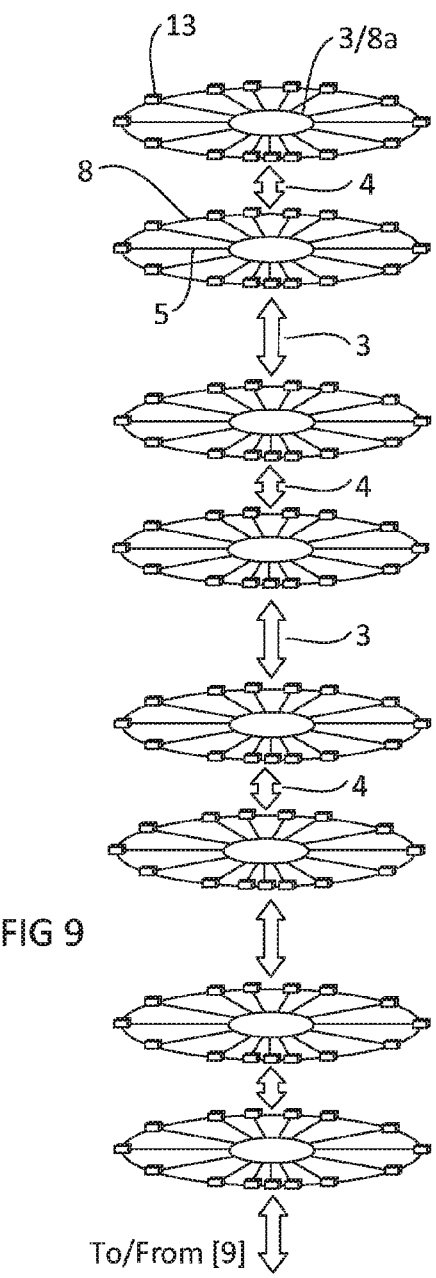
FIG. 9 is a schematic showing the network topology and data connectivity of power modules integrated in a four stack electromagnetic distributed direct drive.

FIG. 9 depicts the resulting network topology, where each power module (or network element) is preferably operating as a three-port network element: the integrated redundant optical interface [11] of each power modules connects to three distinct directions of the meshed optical network: two connections on the external ring network [8] and one connection to the central spokes [5] of a star network, itself connected to the optical feed [3] through the optical splitter [4], both operating as an inner optical coupler located in the plane of the rotor assembly [22], [23].

Figure 6A:
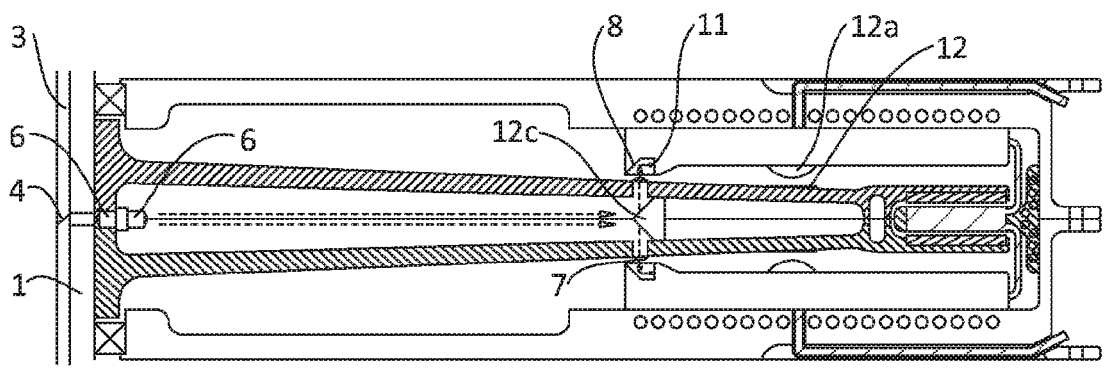
FIG. 6A shows the optical path in a fibreless motor element according to the embodiment shown in FIG. 3D.
Figure 6B:
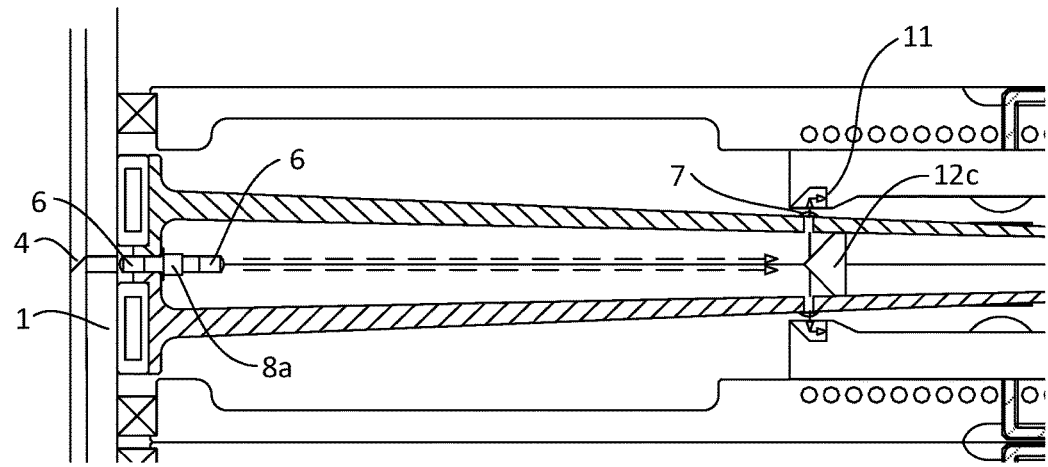
FIG. 6B shows an optical path in a fibreless motor element according to the embodiment shown in FIG. 3C.
Figure 7:
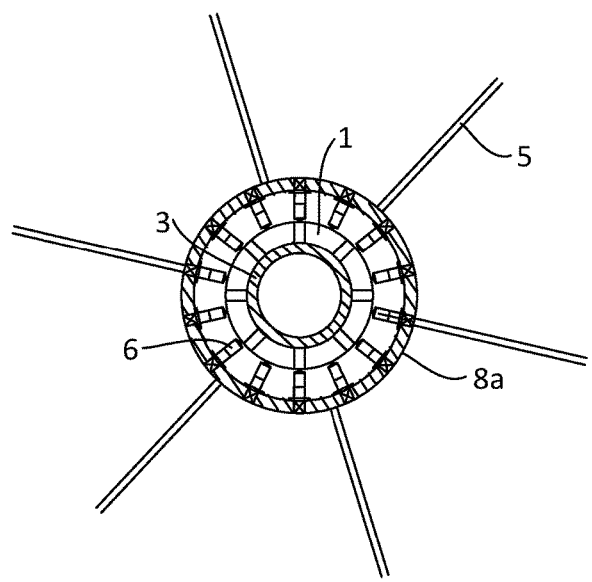
FIG. 7 is a detailed view showing the angular alignment of the main shaft's holes in relation with the lens assembly when a freewheeling unit is utilized.

FIG. 9 shows a notional four stack electromagnetic distributed direct drive, showing four motor elements [35], each one comprising a plurality of power modules assemblies on each side of the rotor [22], [23]. FIGS. 1B, 14B, 2B, 15B, 3B, 17B, 3C, 4B, 16B, 6B show an additional inner ring type optical coupler [8a] installed when a freewheeling system [2a] is used. FIG. 7. Shows that this inner ring type optical coupler [8a] is utilized to parallel light signals coming from the optical splitter [4], through some of the holes machined in rotor hub assembly lining up with those in the main shaft [1]. Light signals propagate in two distinct directions across the ring [8a] and produce even signal levels at each pickup point. Consequently, each power module [13] is interconnected with all the surrounding network elements and aircraft systems by several physically distinct optical routes: the optical feed [3], the external and internal (as required) rings [8] and [8a], respectively and one star network comprising optical fibers assemblies [5]. Those three connections enable transverse communications (between power modules belonging to the same motor element), as well as vertical communication. Vertical communication (between different motor elements) is carried out by the optical feed [3] and its associated optical splitters [4]. Likewise, the optical feed [3] and optical splitter [4] enables communication between upper and lower power modules of a same motor element. FIGS. 6A and 6B show a different embodiment where the optical fibers [5] installed in the rotors assemblies [22] and [23] are replaced by a free space optical link and a plurality of prismatic mirrors [12c].

FIG. 11 shows an example of two CPU wherein CPU 1 (COM Management) manages data transmission and routing, framing, bit insertion, forward error correction (FEC), networking, integrity monitoring, power assignment, as well as communication with the aircraft's main computer. CPU 2 (Power and switching Management) manages rotor position resolver, power transistor sequencing and health monitoring.

Referring to FIG. 11, one or more microcontrollers and/or field-programmable gate arrays execute the following tasks:

Switching sequence of the power transistors: one or more microcontrollers are programmed with instructions necessary to manage the switching sequence of the power transistors arrays driving the stator's windings in function of the power demand and the angular position of each rotor assembly [22], [23] (measured by the built-in optical [12]/[12a] or magnetic resolver assembly).

Resolver management: control of the angular resolver unit, as well as performing signal processing including resolver integrity monitoring and outvoting functions.

Inter module optical communication: Management of the built-in multi-ports optical interface [11]: control of the redundant interface, including integrity monitoring and failure management (selection of the valid LASER (or LED) diodes and photodiodes).

Data management and protocol: Controlling data stream aggregate, data framing, bit insertion, FEC (Forward Error Correction), and access protocol.

Data routing and path diversity management. Data routing is executed when one or several modules (network elements) are found unserviceable.

Communication with the aircraft's flight computer system, carried out by a free space optical link established between one end of the optical feed [3] and the external array of redundant Laser (or LED) diodes/photodiodes [10] connected to electro-optical transceiver interface [9]. The processing power resident in each power module is such that one single power module is capable, on its own, of maintaining communication with the external electro-optical transceiver interface [9]. The decision criteria driving the selection of which power module(s) is in charge of external communication is based on the State of Health (SOH) of the power modules.

Electrical and Environmental Integrity Monitoring (EEIM) at system level, within the electromagnetic distributed direct drive: Detection of out of range temperature values at subsystem level, environmental failure (cooling loss), DC connection loss, electrical damage (current leakage, galvanic insulation fault on high voltage buses) and power distribution fault.

Fault detection at component level (within each power module): Detection of faulty hardware (e.g. transient suppressor) and abnormal response. Detection of communication and networking faults Early warning of power electronic faults: Power transistor's dynamic parameters such as threshold voltages, switching time and transconductance are potential failure precursors suitable for continuous monitoring. Those three parameters can indicate changes correlated with increased degradation. In the case of IGBT devices for example, the trends in the evolution of the parameters helps identifying the failure mechanism in operation, as observed by the changes in the threshold voltage (trapped charges in the gate oxide) and collector-emitter ON voltage (degraded die-attach). Switching parameters such as turn-on delay time and turn-off fall time which are directly affected by gate oxide damage, are also potential precursors to IGBT failure. Transconductance, switching time and threshold voltage are three parameters that can be continuously monitored, stored into a time stamped circular database and compared with the baseline of healthy devices. Deviation in the parameter will trigger an early warning alarm of impeding transistor failure. The disclosed functionalities and the advantages of this integrated early warning system will become apparent to those skilled in the art as bringing an obvious safety improvement over conventional transmissions as well as an effective mean of preventive maintenance enabling "on condition" operation resulting in longer time between overhaul, hence lowered operating cost.

Mechanical Integrity Monitoring (MIM): Vibration sensors positioned on each bearing assembly [2] enable continuous spectral monitoring of each bearing's vibration and noise pattern, in order to detect any deviance from a baseline of healthy devices, subsequently pointing to an impending bearing failure. Vibration sensors are preferably in the form of (but not limiting to) piezoelectric sensors. Fourier Transform techniques are used for signal processing. Fourier envelope (frequency domain envelope of the Fourier transform of the time domain signal) is calculated by one of the built-in processors connected to Analog to digital converters (FIG. 11).

Power module outvoting: The state of health and electrical parameters of each power module is continuously broadcasted throughout the electromagnetic distributed direct drive on a dedicated data channel encapsulated within the main aggregate. Faulty power modules are automatically detected, outvoted and deselected by the remaining valid power modules. The decision process is internally carried out by the plurality of integrity monitoring algorithms resident in each power module, together forming a self-healing system where data traffic is autonomously rerouted in such way to circumvent faulty units. Unlike conventional gearboxes requiring an emergency landing when any fault develops, the disclosed invention enables maintaining flight at somewhat reduced power setting (depending on the number of faulty power modules), but will not require any immediate emergency procedure and is not a life threatening situation.

Autonomous power distribution: each power module develops a fraction of the total power delivered by the electromagnetic distributed direct drive. In view of evenly sharing the total power, each power module is individually capable of autonomous real time power adjustment. Continuous load sharing capability is made possible thanks to inter-module communication. This functionality is particularly useful when one or several power modules are found faulty and subsequently deselected: the power delivered by the remaining valid power modules is increased, within the thermal limits of the system, in order to meet the power demand. All decisions are internally and autonomously executed as a result of the distributed processing resident in the electromagnetic distributed direct drive, without requiring any assistance from external sub-system.

Pilot Input Interpreting Mode: enables maintaining the electromagnetic distributed direct drive operational in the case of the following events (occurring separately, or in random combination of each other):
  i. Loss of external communication between aircraft's main flight control unit and the electromagnetic distributed direct drive; and/or
  ii. Degraded communication between motor elements (e.g. in the case of ballistic impacts); and/or
  iii. Degraded aircraft's main flight control unit.

The power modules are programmed with instructions enabling them to autonomously adjust their power settings in order to maintain preset vital parameters such as main rotor rotational speed in the case of an emergency involving events listed in i, ii, iii (or random combinations of the events). Additionally, the plurality of power modules is programmed with instructions enabling them to interpret torque patterns transmitted by the main airscrew shaft [1] and react by triggering a predefined sequence of power settings and flight patterns. For example, the pilot of a helicopter equipped with an electromagnetic distributed direct drive may use the collective input to control the behavior of the electromagnetic distributed direct drive in the case of total loss of onboard transmission: the pilot may sharply raise the collective lever and lower it immediately, subsequently producing a torque pulse on the main shaft [1]. This torque pulse (measured through the stator's windings) may be interpreted by the motor elements [35] as an order to maintain a given power setting for a given amount of time. By leveraging predefined patterns of torque pulses applied through the use of collective inputs, the pilot may be able to control the power setting and initiate a climb, or a descent towards a landing spot, even in the case of a severely damaged aircraft suffering from a total loss of internal communication.

Although one microcontroller per power module may be sufficient to execute the tasks, each power module may preferably include several microcontrollers organized for redundancy and task sharing. In the embodiment shown in FIG. 11, for example, two microcontrollers are used: one CPU (Central Processing Unit) is dedicated to the control of the power transistors arrays as well as all tasks related to power control, whilst the second CPU is assigned to signal acquisition (management of Analog-Digital converters), signal processing (Fourier analysis of vibration spectrum), data communication, data routing and networking functions. Other architectures using a different number of microcontrollers or field programmable gate arrays can be used.

DC power-line filters, enable two main functions:
 i. Preventing conducted RF harmonics generated by the power switching circuitry from propagating back onto the DC lines and affecting surrounding sub systems, such as avionics.
 ii. Providing EMP, RFI, and ESD hardening through the integration of multipole filter inserted in the DC inputs and capable of meeting EMI/EMC standards, such as MIL-STD-461/462; additionally the filters may be paralleled with grounded transient suppressors addressing ESD and EMP hardening. Transient suppressor circuitry can include a plurality of combined devices such as zener diodes, as well as gas discharge tubes.

Distributing DC filtering within each power module implies that each DC filter only carries a fraction of the total current required by the whole electromagnetic distributed direct drive, making possible the use of high permittivity ferromagnetic materials in the manufacturing of the inductors constituting the filters.

Filters revolving around high permittivity ferromagnetic materials are small enough to be capable of integration into the power module, resulting in compact and lightweight assembly. By contrast, high current DC filters designed to carry the total power required by a single conventional motor controller have to deal with magnetic saturation of the ferromagnetic materials used in the production of inductors, resulting in considerably heavier component weight.

Each power module may be shielded by a grounded lightweight metallic casing, such as metalized fire retardant composite material. This light RF shielding act as a Faraday's cage; it is mainly effective in the higher frequency range of the spectrum (20 MHz and above) where skin depth penetration is low. In addition to this light shield, the structural metallic casing assemblies [20] and [21] provide a particularly effective additional shielding blocking low frequency RF signals.

By combining two levels of electromagnetic shielding, the disclosed solution leads to significant improvements in shielding effectiveness as well as weight savings, when compared with conventional split systems where the external controller's casing has to be physically dimensioned to meet magnetic and electric shielding protection levels required by EMP standards, yet serving no structural purpose.

Figure 23:
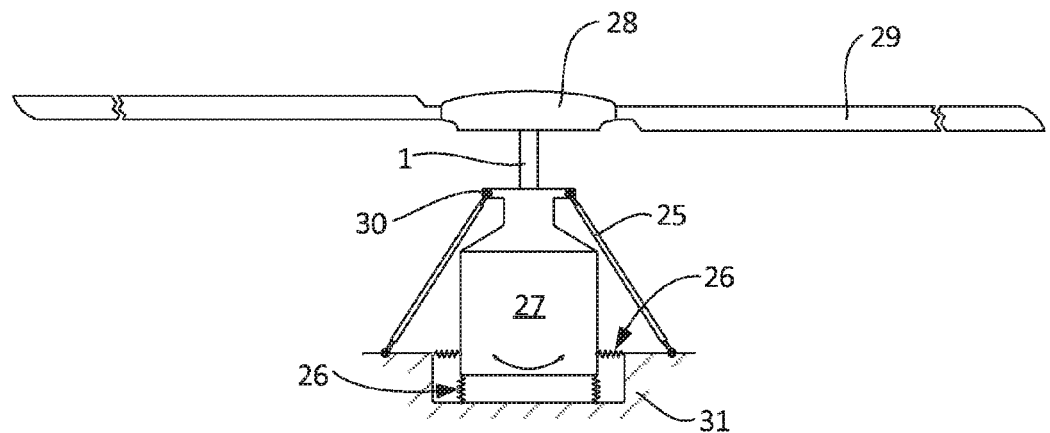
FIG. 23 is a schematic showing a transmission held by a focal point suspension and its associated retention members and elastomeric stops.

Referring now to FIG. 23, most helicopter transmissions [27] are mechanically secured to the airframe [31] by what is known as: focal point suspension. The transmission is restrained from the top by a plurality (e.g. four) of members, or retention tubes [25], each retention tube being terminated on both extremities by a rod end bearing (spherical bearing) [30] allowing the transmission's casing to slightly oscillate about the top focal point in order to filter out the vibrations generated by the main rotor (the bottom end of the transmission is usually secured along the yaw axis by a plurality of laminated elastomeric stops [26] that bear the forces resulting from the torque as well as providing vibrations damping). This architecture is very effective to filter out vibrations and is a common solution implemented on most modern helicopters. However, electrical connectors and cabling connected to transmission's casings may suffer from premature ageing resulting from continuous low frequency oscillations. A solution addressing DC supply and data communication is disclosed.

Conventional two-line DC power cabling is not an appropriate way of supplying the electromagnetic distributed direct drive, when a focal point suspension is used, since:

Heavy gauge cabling is not flexible enough and will suffer from fatigue induced cracking, aggravated by its own inertia and possible mechanical resonance.

Two cables don't provide path diversity and present an obvious single point of failure (SPOF), leading to poor ballistic impact resilience.

Heavy gauge cabling requires larger bending radius, hence more material, resulting in heavier system weight.

Referring now to FIG. 21 there is shown an example of redundant DC supply applied to a two-stack electromagnetic distributed direct drive, although the same layout is applicable to a multiple-stack electromagnetic distributed direct drive. A plurality of insulated stationary ribbons pairs [34] restrained to the airframe carry the DC to small gauge cables [33], connected to the power modules. FIG. 21 illustrates a redundant system where four ribbons pairs are used. Each ribbon pair [34] comprises two ribbons (positive and negative) separated by a dielectric; each ribbon being connected to the terminals of the main power bus. The resulting symmetrical line improves radiated emission and radiated susceptibility characteristics. Ribbons [34] are fed from aircraft's high voltage DC bus in different locations for further mechanical decoupling and path diversity. The number of ribbons pairs [34] may be increased as the size and power of the electromagnetic distributed direct drive is increased. Thin and wide aluminum ribbons can be used, enabling small bending radius hence weight savings.

The aspect ratio (width/thickness) of the ribbons is optimized to maximize radiative and convective cooling.

A plurality of small gauge cables connected to the ribbons feed the motor elements' inputs [16] with DC.

Each cable only carries a fraction of the total current: small gauge cables are more tolerant to vibrations and given the right bending radius will provide long service life as a result of excellent fatigue resistance. In a preferred embodiment of the invention, each bundle forming a DC cable comprises a high number of thin strands in order to withstand high number of flexion cycles.

The plurality of cables offers path diversity and eliminates single point of failure. Additionally, light gauge cables can be installed in pairs to improve path diversity and fault tolerance.

Thermal analysis based on Me/son and Both relations shows that several smaller isolated cables operating in parallel offer a better cooling capacity than a single heavy gauge cable.

DC cabling and ribbons pairs do not necessary require specific RF shielding since the filtering units built in each power modules eliminate conducted emissions and susceptibility.

The total weight of the disclosed solution is lighter than a conventional two line topology.

As previously described, the electromagnetic distributed direct drive may use an internal meshed optical communication system utilized to vertically and transversally interconnect all the power modules in a fault tolerant network configuration. Each power module is a network element, preferably interconnected with the surrounding network elements via an IP based optical network.

The internal optical network, within the electromagnetic distributed direct drive, is organized around two members:
 i. The optical feed [3], with its optical splitters [4].
 ii. The optical ring coupler assembly [8] and [8a] (when applicable).

Helicopter's main rotor shaft [1] (or airplane's propeller shaft [1]) are usually built from seamless tubing such as high tensile 4130 chrome-molly steel, or forged grade-5 titanium. The inner part of such shaft is the most mechanically protected area of the whole transmission unit (if not the whole aircraft) and hosts the optical feed [3] and with the associated optical splitters [4].

The optical feed [3] is a thick-wall transparent tubing, where light signals propagate mostly through the transparent material. This preferred center-based topology eliminates vulnerable bundles of external optical fibers or multiple inter-stage connections that would normally be required to interconnect motor elements and power modules; it provides inherent mechanical protection to the optical communication assembly and drastically minimizes the number of components involved, as well as removing all connector interfaces. When extended up to the hub of a rotor head [28] or a propeller (as depicted in FIG. 20), the optical feed can bring data communication to the electronics controlling cyclic and/or collective pitch of the plurality of blades [29] attached to that hub. Consequently, the optical feed can simultaneously carry the data traffic related to the electromagnetic distributed direct drive management, as well as traffic related to flight control.

Power modules [13] hosted by a given motor element [35] are radially interconnected via several equal split ring-type optical couplers [8] and [8a] (when applicable). Those two ring-type optical couplers are themselves cross-connected through a plurality of optical fibres [5] integrated within the rotor frame assembly [22], [23], or via a plurality of free space links and prismatic reflectors [12c].

The resulting multipath meshed network based on star, spur and ring topology enables fault tolerant communication between power modules, through several distinct optical routes.

Industry's usual answer to EMP resilience is through the use of multiple optical fibers deployed in place of conventional copper cabling carrying data communication. However, optical fibers and their associated connectors are traditionally quite fragile, require large bending radius and can become heavy when mechanically reinforced. Considering the high vibration environment in which the electromagnetic distributed direct drive operates, connecting many power modules to the aircraft's flight computer through conventional optical fibers is not a recommended option: the high number of power modules installed in an electromagnetic distributed direct drive would require a large number of connector interfaces leading to increased weight, high production cost and statistically reduced reliability.

In some embodiments, the disclosed invention uses a free space optical link providing data communication between the aircraft's flight computer and the electromagnetic distributed direct drive. The free space link is established between the electromagnetic distributed direct drive and a distant array of redundant LASER (or LED) diodes & photodiodes [10] mounted onto the airframe and connected to the electro-optical transceiver interface [9]. Consequently, all signaling and data lines are eliminated. FIGS. 1A, 1B, 2A, 2B, 3A, 3B, 3C, 3D, 4A, 4B, 15A, 15B, 16A, 16B, 14A, 14B, 15A, 15B, 16A, 16B, 17A, 17B, 18A, 18B, 19 and 20 depict the optical communication system and FIGS. 5, 6A, 6B, 7, 8, 9, 10 show the light path.

The Electro-Optical Transceiver Interface [9] is a multi-channel fault tolerant subsystem capable of establishing bidirectional data communication between the on board's flight computer(s) unit(s) and the electromagnetic distributed direct drive. It can also provide, when applicable, communication between the on board's flight computer(s) unit(s) and the rotor head [28] of a helicopter as shown in FIG. 20, or with the pitch control unit installed in the hub of a constant speed propeller.

Figure 12:
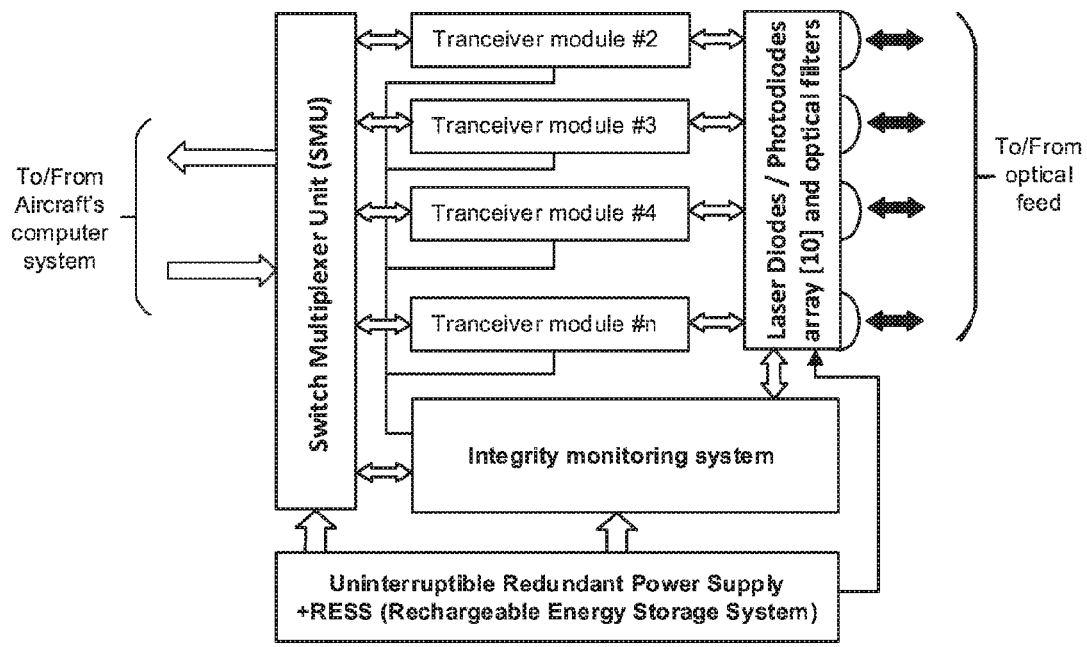
FIG. 12 is an electro-optical transceiver interface block diagram.

The Electro-Optical Transceiver interface [9] connects to the electrical ports of the flight computer unit (using common bus protocols such as, but no limiting to: ARINC 429, 629, or CAN), formats the data streams and drives the arrays of LASER (or LED) diodes and photodiodes pointing towards the optical interface of the optical feed [3] in order to establish a free space optical link with the electromagnetic distributed direct drive. The array of LASER diodes (or LED) and photodiodes [10] is connected to the electro-optical transceiver interface [9] via one or several wiring paths. The electro-optical transceiver interface block diagram detailed in FIG. 12 depicts a multichannel system including a plurality of redundant transceiver modules operating in parallel, with their inputs connected to a front end Switch Multiplexer Unit (SMU) controlled by the integrity monitoring circuitry.

The integrity monitoring system detects the response of any diverging transceiver module and sends a signal to the SMU in order to disconnect the input of the faulty transceiver module as well as turning its power off. The SMU can be used as safety device in order to disconnect the input of a faulty transceiver unit failing in dead short. In a different embodiment of the invention, transceiver modules using high impendence input ports may be utilized: the SMU is subsequently removed, all the inputs of the transceiver modules paralleled and connected to the main input/output ports. In this configuration, any faulty transceiver module is deselected by turning its power supply off.

This multi redundant system insures fault tolerance and maintains system failure rate to a level compatible with aircraft-grade requirements. Each transceiver module includes the following circuitry:
 i. Input/output interfaces with aircraft fight control system. Protection circuits and filtering (addressing EMI/EMC and EMP resilience).
 ii. Data management circuitry, data buffering, error detection and forward error correction.
 iii. LASER (or LED) drivers and failure detection circuitry.
 iv. Analog amplifiers, comparators and drivers connected to the photodiodes.
 v. Microcontroller and/or FPGA managing the vital function of the transceiver unit.

Each transceiver module's output is connected to its own associated array [10] of redundant Laser diode (or LED) & photodiode, equipped with their dedicated optical filter (as required). Optical filters tuned on different wavelengths (colors) may be used to create independent sub-networks in view of isolating data traffic allocated to different vital functions of the aircraft, (such as flight controls) from the electromagnetic distributed direct drive. The system is preferably supplied by an uninterruptible redundant power supply (URPS) unit comprising built in rechargeable energy storage system (RESS) backup.

The electro-optical transceiver interface [9] drives a plurality of arrays of redundant LASER (or LED) diodes and photodiodes [10] equipped with their associated optical filters (as required). The arrays, pointing towards the extremity (optical interface) of the optical feed [3], establish a bidirectional free space data link with the electromagnetic distributed direct drive. Most of the light signals propagate through the transparent material constituting the optical feed [3], in the same manner as in a multimode optical fiber. The extremity of the optical feed [3] (surface facing the arrays of Laser diodes (or LED)/photodiodes [10] as shown in FIGS. 18A and 18B) can be flared and coated with antireflection treatment in order to optimize light transmission.

Figure 18A:
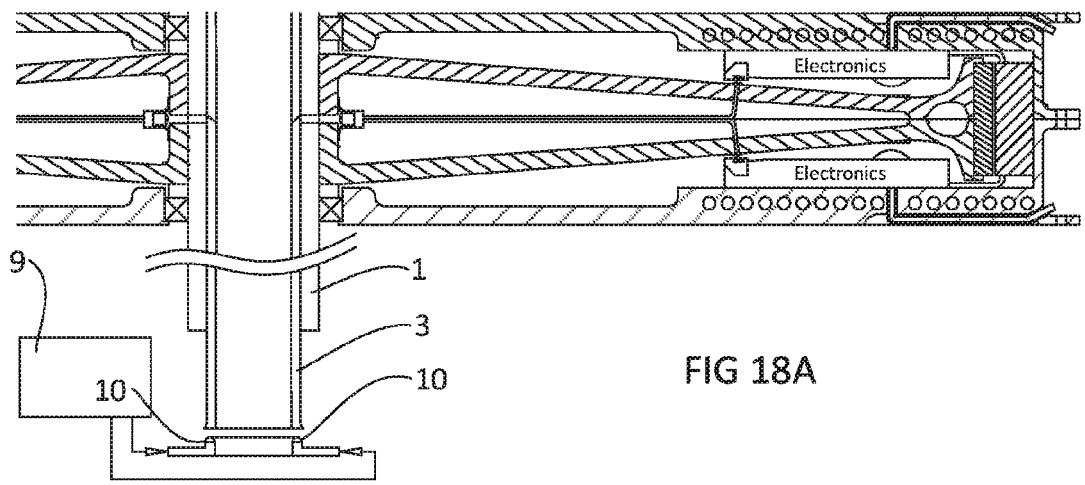
FIG. 18A is a side view of the optical transmission system of the radial flux electromagnetic distributed direct drive of FIGS. 14A, 15A, 16A and 17A.
Figure 18B:
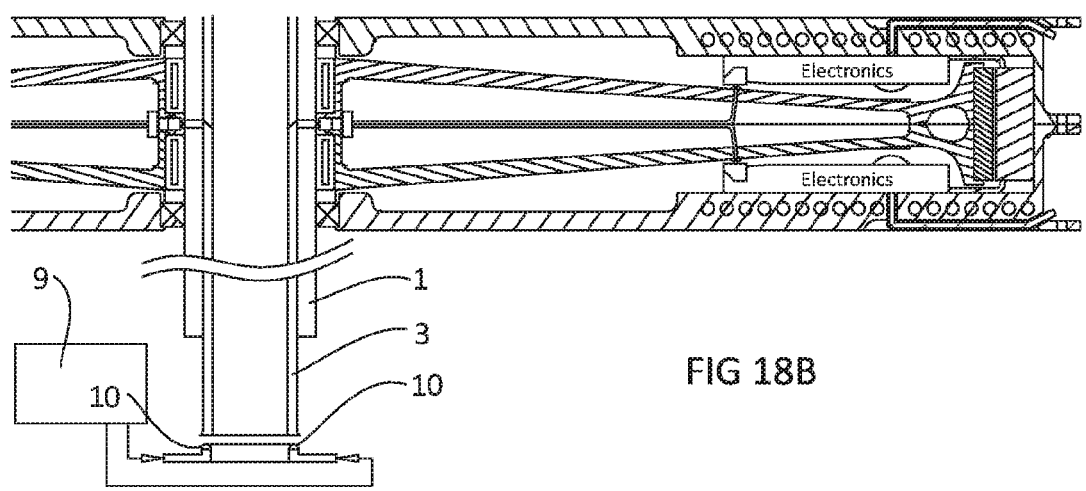
FIG. 18B is a side view of the optical transmission system of the radial flux electromagnetic distributed direct drive wherein mechanical power is transmitted to the shaft via a freewheeling unit of FIGS. 14B, 15B, 16B and 17B.

FIGS. 18A and 18B both show the fault tolerant electro-optical transceiver interface [9] providing free space data transfer between the electromagnetic distributed direct drive and main flight computer. FIG. 18B shows the variation where mechanical power is transmitted to the shaft via a freewheeling unit.

The electro-optical transceiver interface [9] and diodes arrays [10] can be eliminated and replaced by a bundle of optical fibers when the onboard flight computer unit is equipped with built-in redundant optical interfaces. One end of the bundle of optical fibers is connected to the optical ports of the onboard flight computer unit, whereas the other end can be fitted with crimped lenses interface installed in such way to face the extremity of the optical feed [3] (the lenses interfaces are directly installed underneath the optical feed [3], in place of the array of redundant LASER (or LED) diodes [10]).

Figure 19:
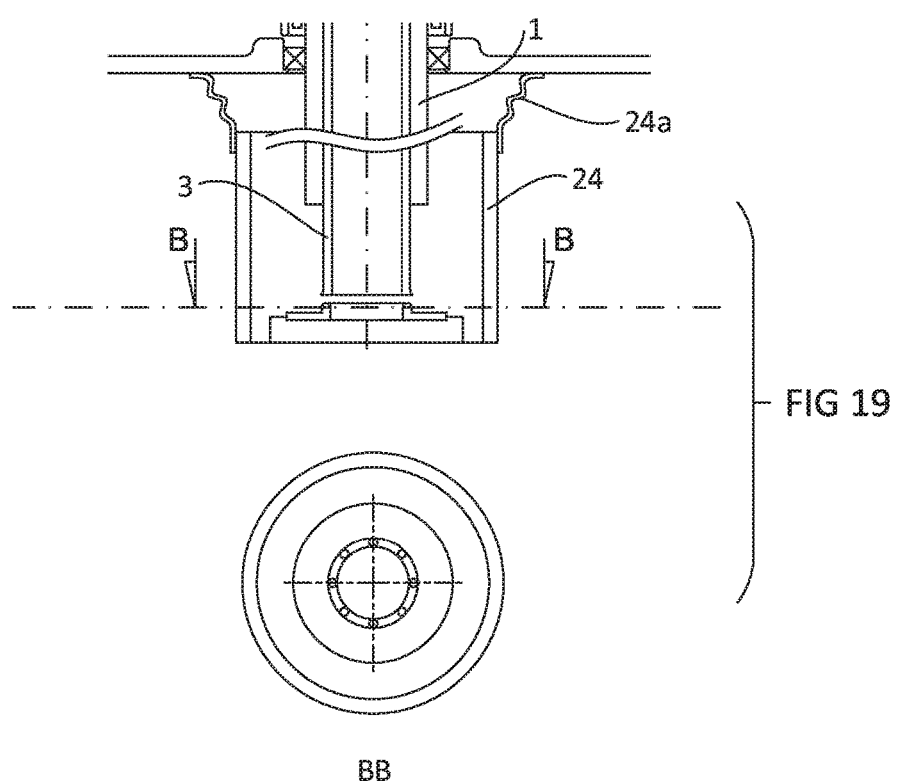
FIG. 19 shows a cylindrical shield for ballistic and mechanical protection of the optical feed and its associated rubber boot.

The electro-optical transceiver interface [9] and associated arrays of redundant diodes/photodiodes [10] are preferably mounted onto the airframe [31], whereas the electromagnetic distributed direct drive can be restrained by a focal point suspension and is therefore free to oscillate in order to provide vibration damping. A free space optical data link between the optical diode arrays [10] and the optical feed [3] is tolerant to the slight angular misalignments induced by the electromagnetic distributed direct drive oscillation. Consequently, the electromagnetic distributed direct drive does not require any physical data connection (the only connection to the electromagnetic distributed direct drive is the plurality of small gauge DC power cables [33]). FIG. 19 shows a cylindrical shield [24] protecting the gap between the optical array [10] and the optical feed [3] against foreign material ingress and ballistic impacts. Additionally, a flexible rubber boot [24a] seals the small gap between the top of protective shield [24] and the electromagnetic distributed direct drive's body in order to protect against dust and contaminants ingress. The small physical dimensions of the diode arrays [10] and the short distance separating them from the optical feed [3] make this area easier to effectively protect with small size shield (such as Aramide/ceramic reinforcement).

Figure 5:
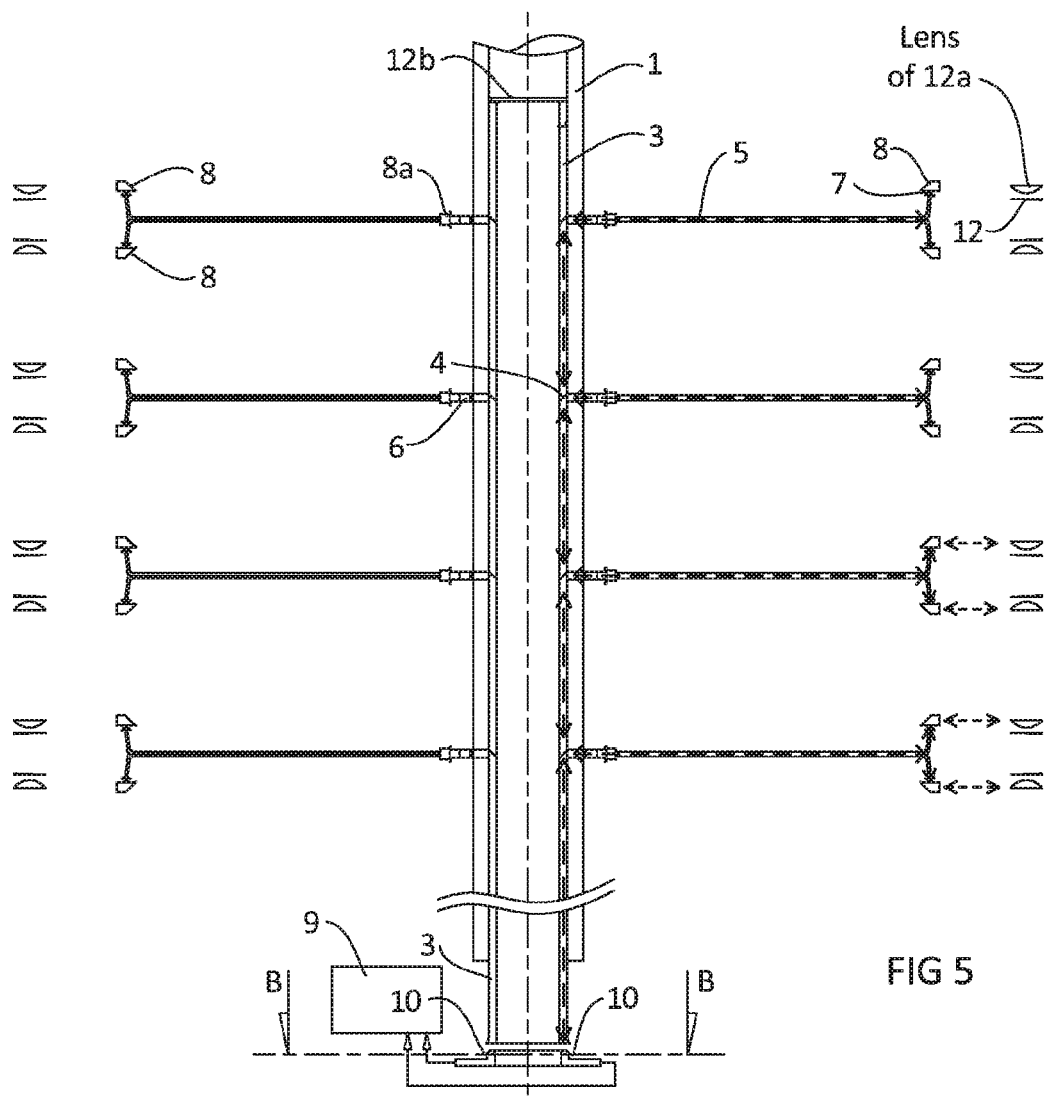
FIG. 5 shows an optical path according to one element of the present invention.

Referring now to FIG. 5, the optical feed [3] is fitted with a plurality of optical splitters [4]. Each optical splitter [4] being located in the mid plan of each rotor assembly [22]/[23] in order to redirect towards the rotor assembly (through small holes machined in the shaft [1]) a fraction of the light signals propagating through the optical feed [3].

Referring now to FIG. 20, the optical feed [3] can extend up to the main rotor head [28], when used on rotary wing aircraft, to transmit data to the electronic and electromechanical actuator systems, in order to control the pitch angle of rotor blades [29]. Conversely the optical feed [3] can extend up to the propeller hub [28] when used on fix wing aircraft, in order to transmit data to the electronic and electromechanical actuator systems in order to control the pitch angle of propeller blades [29].

The signal sampled by each optical splitter [4] is received by a plurality of lenses [6]. The plurality of lenses [6] is connected to optical fiber pairs [5] that distribute the optical signals outwards, to outboard lenses [7] installed on both side of the rotor assembly [22]/[23] (refer to FIGS. 17A, 17B, 3A and 3B).

Only two functional fibers (one on each side of a given rotor assembly [22]/[23]) are necessary to carry the optical signal to the outer set of lenses [7]; however FIGS. 2A, 15A depict a notional arrangement where six pairs of optical fibers are installed for redundancy, path diversity as well as to reduce transmission loses, although a higher or lower number of optical fibers may be used. The optical fibers are mechanically protected by the top and bottom rotor assemblies [22] and [23] and restrained by spacers (not shown). The optical fibers [5] can be crimped to the lens assemblies [6] and [7], hence removing optical connectors). The outboard lenses [7] aim towards the optical ring coupler assembly [8] inserted into circular notches machined into the power modules. FIGS. 3A and 3B, 17A, 17B depict the mechanical arrangement of such configuration whereas FIG. 5 shows the optical path throughout the whole electromagnetic distributed direct drive.

Figure 3C:
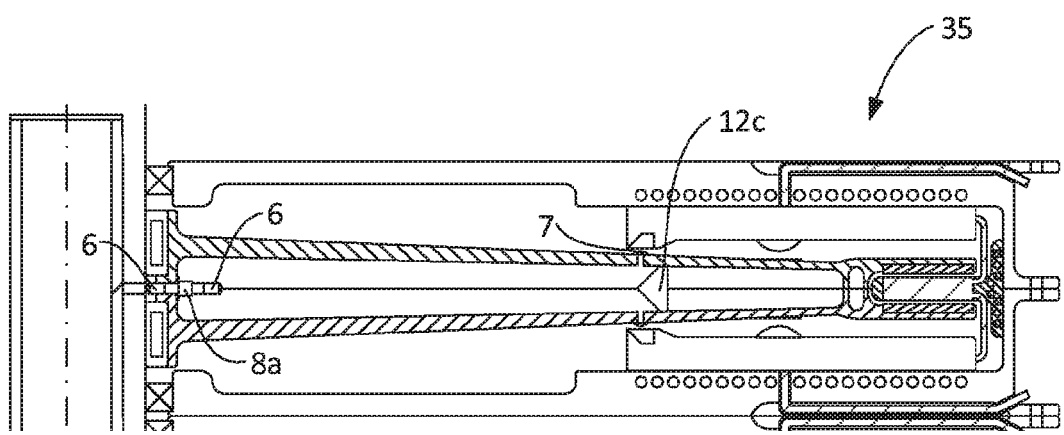
FIG. 3C is the detailed side view of the motor element of FIG. 3B using a fibreless assembly.
Figure 3D:
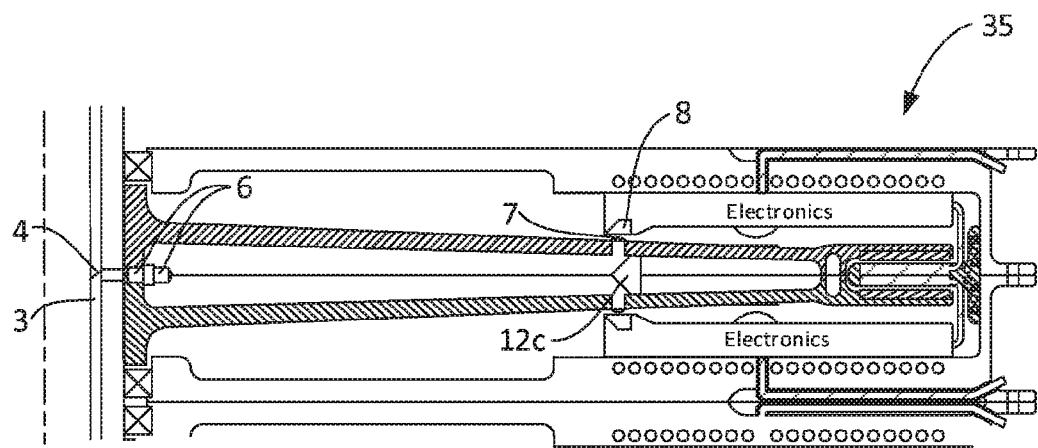
FIG. 3D is the detailed side view of the motor element of FIG. 3A using a fibreless assembly.
Figure 4B:
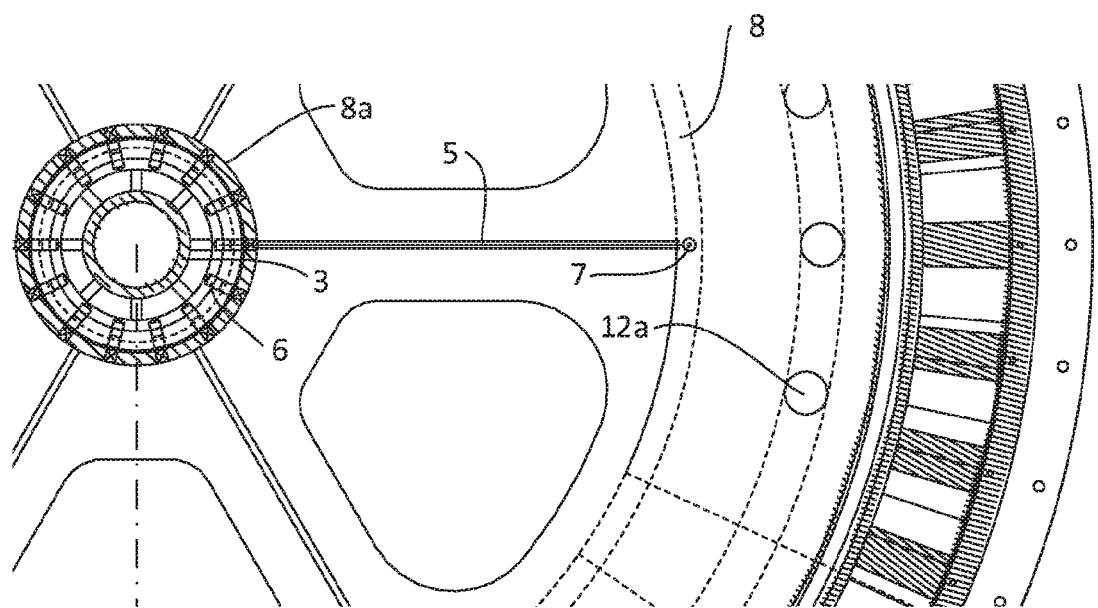
FIG. 4B is a top view of the optical layout of an axial flux electromagnetic distributed direct drive wherein mechanical power is transmitted to the shaft via freewheeling units according to the embodiment shown in FIGS. 1B and 2B.
Figure 4A:
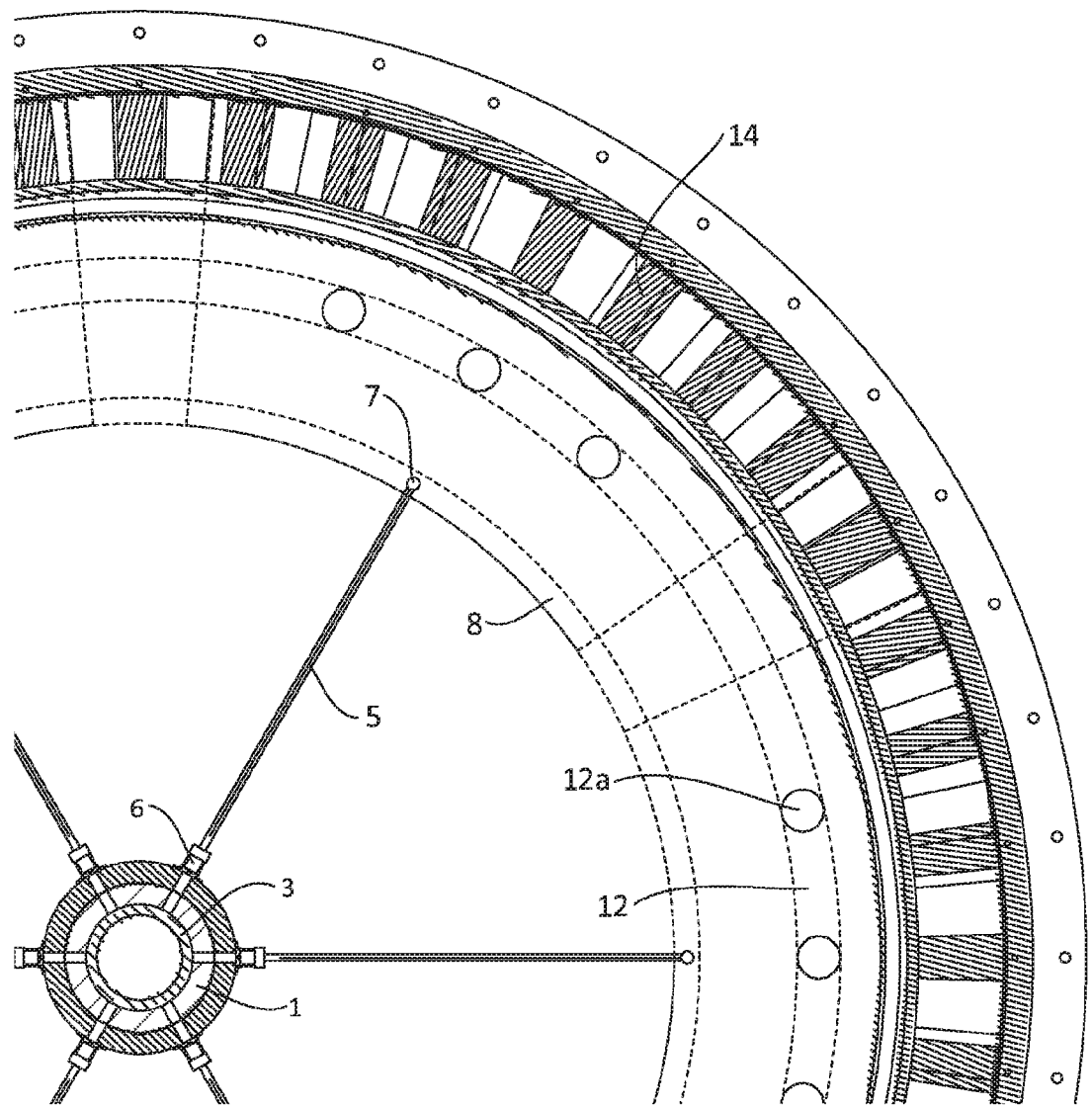
FIG. 4A is a top view of a cross section in the rotor plane showing the optical layout of an axial flux electromagnetic distributed direct drive according to the embodiment shown in FIGS. 1A and 2A.

FIGS. 6A and 6B show the light path in another embodiment of the invention, where the groups of optical fiber assemblies [5] are replaced by free space links established between the optical splitter [4] and the rotor lenses [7]. The system includes two sets of hub lenses assemblies [6] mounted back to back. One end of the lens assemblies [6] collects light signals radiated by the optical splitter [4], whereas the opposite end of [6] transmits the light signals towards a plurality of radially installed triangular prismatic mirrors [12c] located within the outboard section of the rotor assembly. The triangular prismatic mirrors reflect the light signals towards the outer rotor lenses [7] located on both sides of the rotor and pointing towards the ring type optical coupler [8]. Each lens assembly [6] located in the hub can include several lenses mounted back to back, or alternatively one specific lens presenting the appropriate focal lengths on each of its side). FIGS. 3C and 3D, depict the mechanical arrangement of such configuration. This compact arrangement is most suited for small size electromagnetic distributed direct drive.

FIGS. 1B, 14B, 2B, 15B, 3B, 17B, 3C, 4B, 16B show an embodiment using a freewheeling unit [2a] where, the signal sampled by each optical splitter [4] is received by a set of lenses [6] connected to the internal surface of the inner ring-type optical coupler [8a] installed within the rotor assembly [22], [23]. The purpose of the inner ring-type coupler [8a] is to act as an equal split coupler enabling to parallel the light signals coming from the optical splitter [4], through some of the small holes machined in the shaft [1] and collected by the lens assembly [6]. FIG. 7 shows that the number of holes machined in the main shaft [1] (and their angular spacing) and the number of lenses [6] (and their angular spacing) are chosen in such way that light signal transmission is always possible, regardless of the relative angular position of the rotor assembly [22], [23] with the main shaft [1]. FIGS. 2B, 15B, 4B, 16B, and 7 depict cross sections taken in the holes' plane showing how two holes in the shaft always align with at least two lenses.

The external surface of the hub-based ring-type optical coupler [8a] is connected to a plurality of optical fiber pairs [5] that distribute the optical signals outwards to sets of outboard lenses [7] installed on both side of the rotor assembly [22], [23] (refer to FIGS. 2B, 3B, 4B, 15B, 16B, and 17B).

Only two functional fibers [5] (one each side of a given rotor assembly [22], [23]) are necessary to carry the optical signal from the inner ring-type coupler [8a] to the outer set of lenses [7]. However, FIGS. 2B and 15B depict a notional arrangement where six pairs of optical fibers are installed for redundancy, path diversity as well as to reduce transmission loses, although a different number of optical fibers can be used. The optical fibers are mechanically protected by the top and bottom rotor assemblies [22] and [23] and restrained by spacers (not shown in the FIGS.). The optical fibers [5] can be crimped to the lens assemblies [6] and [7], hence removing optical connectors). The outboard lenses [7] aim towards the fix outer ring coupler assembly [8] inserted into circular notches machined into the power modules. FIGS. 3B and 17B depict the mechanical arrangement of such configuration whereas FIG. 5 shows the optical path throughout the whole electromagnetic distributed direct drive.

In another embodiment of the invention, the optical fibre assemblies [5] are replaced by multiple free space links established between the hub and the outer rotor lenses [7]. Onto the external surface of the hub based ring-type optical coupler [8a] is installed a plurality of outer lens assemblies [6] coupling to free space some of the light signals circulating within the optical ring. The outer lenses aiming towards the apexes of triangular prismatic mirrors [12c] reflecting the light signal towards the rotor lenses [7] installed on both sides of each rotor assembly. The triangular prismatic reflectors are radially installed within the outboard section of the rotor assembly [22], [23] with their apex pointing towards the hub (hence, towards the outer lens assembly [6] connected to the inner ring type optical coupler [8a]. FIG. 3C depicts the physical arrangement of such configuration, whereas FIG. 6B shows the optical path. This compact arrangement is most suited for small size electromagnetic distributed direct drive.

Although the optical hub assembly is described, for ease of understanding, as including three separate components (two sets of lenses assemblies [6] and on ring type optical coupler [8a]), the actual hub assembly can be formed of only one part: a monolithic ring type optical coupler onto which are machined (and polished) sets of lenses, both on the internal and external surfaces.

The light signals radiated by the plurality of outboard lenses [7] installed on the top and bottom of the rotor frame assemblies [22] and [23] are received by the outer fix ring-type optical coupler [8] that:

Parallels the signals coming from all the rotating optical lenses assemblies [7].
Conveys the light signals to the power modules' optical transceiver interfaces [11] (Photodiode/LASER diodes).
Enable transversal communication between power modules.

Referring now to FIG. 9, there is shown the resulting network topology, i.e. a bidirectional meshed optical network including the optical feed [3] and its optical splitters [4], an inner ring type optical coupler [8a] (as required), a plurality of optical fibers [5] and an outer ring-type optical coupler [8] altogether providing both transverse and vertical communications.

Light signals coming from the optical fibers assemblies [5] circulate across the inner ring coupler [8a] depicted in FIG. 5 and propagate to the optical feed [3], through the lens assembly [6] and optical splitters [4].

Figure 10:
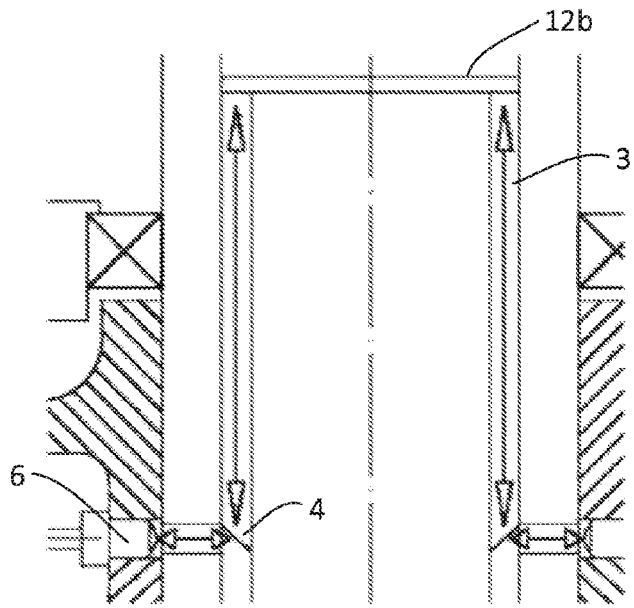
FIG. 10 shows the light path between the lens assembly and mirror, through an optical splitter.

Additionally, those light signals are divided by the optical splitter [4] and propagate longitudinally into the optical feed [3]. The mirror [12b] installed on the top of the optical feed [3], reflects the light signals which recombine into the optical splitter [4] resulting in improved coupling coefficient (lower transmission losses) between optical ports. FIG. 10 shows the light path and optical recombination process.

Referring now to FIG. 20, the optical feed [3] may extend up to the rotor head of a rotary wing aircraft [28], to maintain communication with blade pitch control systems. The resulting bidirectional meshed optical network, including the optical feed [3] and its optical splitters [4], two ring-type optical couplers [8], [8a] and a plurality of optical fibers, provides both transverse and vertical communications. The main shaft [1] is lined with the optical feed [3] (FIGS. 4B and 5) and its associated optical splitters [4].

In one embodiment of the invention, the optical feed [3] comprises several sections of thick wall transparent tubing made of material such as (but not limiting to) polycarbonate. The sections are longitudinally stacked and separated from each other by the optical splitters [4]. Each optical splitter [4] is tightly inserted in-between two section of transparent tubing and is located in the mid plan of a rotor assembly [22], [23], facing the holes in the shaft [1] and lenses assemblies [6]. Each optical splitter [4] is conventional in its design in that it includes one or several layer(s) of transparent material angled at +/−45 degrees (from the longitudinal axis of the optical feed) presenting a refractive index different from the material utilized for the optical feed [3]. In view of optimizing transmission coefficient, the mating surfaces between optical feed and optical splitter are impedance matched using antireflective optical treatment (e.g. coating).

In another embodiment of the invention, each optical splitter [4] may be bonded using optical bonding agent, or welded to the tubing constituting the optical feed [3] instead of being pressed in between two sections of optical feed [3]. The 45 degree optical splitter couples some light in the plane of each rotor assembly [22], [23]. When a small number of motor elements is involved, this solution presents the advantage of low end-to-end transmission loss (that is the transmission loss between the optical interface [11] of a given power module and another power module's optical interface or the array of redundant Laser (or LED) Diodes & photodiodes & optical filters [10]).

In yet another embodiment of the invention, the optical splitters [4] are realized by etching coarse cylindrical stripes on the outer surface of a seamless optical feed [3]; the cylindrical areas being located in the mid-plane of each rotor assembly. As a result, a fraction of the light propagating through the optical feed [3] is scattered by the granular etching of the stripes and is received by the hub lenses assemblies [6]. Fresnel lenses may also be etched into the optical feed [3] in order to concentrate more light in the direction of the lenses assemblies, subsequently lowering transmission losses. Using a seamless etched optical feed [3] presents the advantage of providing almost identical levels of coupling at each motor element. Furthermore, the seamless optical feed [3] is monolithic and presents excellent mechanical resistance. This solution may be preferred when a large number of motor elements are considered.

Optical fibers [5] installed within the rotor assembly are plugged into the lenses assemblies [6] on one end and can be crimped into the lenses interfaces [7] on the other end (no connector is used). This highly redundant layout insures that the failure of one or several fibers has no consequence on the system's operation.

Figure 8:
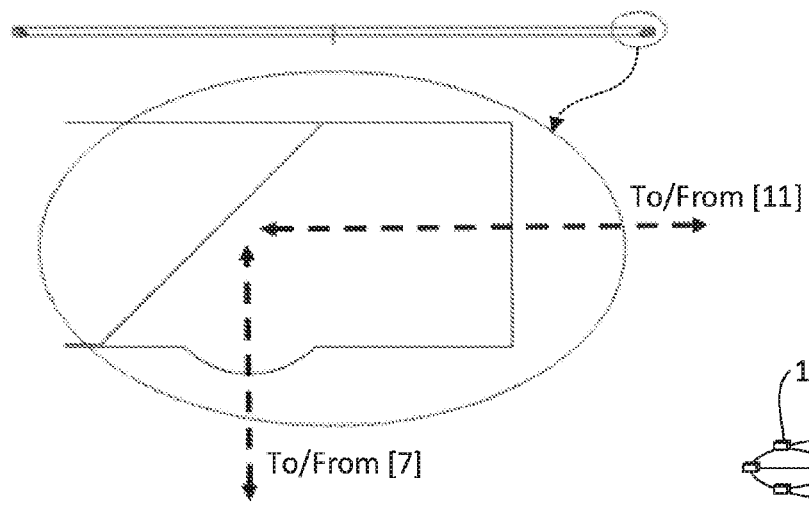
FIG. 8 is a cross section showing the light path through the outer ring-type fix, optical coupler and its reflector assembly.

The ring type optical coupler [8] is inserted into a moon-shaped notch machined into each power module (FIGS. 2A, 2B, 4A, 4B, 15A, 15B, 16A, 16B) and is pressed against the optical filter and Laser diodes/photodiodes assemblies [11] of each power module optical front end (FIGS. 3A, 3B, 17A and 17B). The notch is preferably located on the "cold" side of the power module (opposite side of the power transistors). In view of achieving even coupling coefficient at each optical port, the optical ring coupler [8] can be made of macromolecular and/or doped polymer enhancing light diffusion within the material. A cost effective technique uses fast prototyping manufacturing where a transparent liquid resin polymerized by laser beams results in transparent parts presenting excellent diffusion characteristics. Light diffusion can be enhanced by the use of a coarse grained 45 degree angle reflector capable of scattering light within the ring. FIG. 8 illustrates the general layout of the ring, in and out directions are indicated by arrows, although the system is inherently bidirectional.

A circular lens can be machined in the ring type optical coupler [8], in the area facing the outboard lenses assemblies [7], so as to minimize transmission losses between [7] and [8]. FIG. 8 depicts this circular lens, as well as a magnified cross section of the area pressed against the optical interface [11], part of the power modules [13].

In another embodiment, suitable for use in the freewheeling system, the rotating ring-type optical coupler [8a] can be made of transparent material coated at the port interfaces with anti-reflective layers (that is towards the inner lenses and towards outer optical fibers or lenses). Even coupling coefficient at each port interface can be achieved through light diffusion within the ring [8a] resulting from the use of a macromolecular and/or doped polymer material, combined with light scattering produced by coarse grained top and bottom reflectors.

End to end transmission losses between the laser diodes arrays [10] and the optical interface [11] of a given power module can be relatively high since the light signals propagate through different mediums, alternatively changing from free space (air) to optical fibers as well as through optical filters. However the notional person skilled in the art is aware of currently available Laser diodes commonly capable of generating power in the order of 50 to 100 mW (that is 17 to 20 dBm). Such power level effectively compensates cumulated path losses, subsequently achieving sufficient path power budget insuring flawless data transmission. Furthermore, signal spreading techniques "communication protocol and access" are very effective in improving path budget.

Referring now to FIG. 5 there is shown the optical paths interconnecting power modules, motor elements and external systems such as aircraft's flight computer, via the electro-optical transceiver interface [9]. The disclosed bidirectional meshed network is capable of establishing data communications between all the power modules, regardless of their physical location within the electromagnetic distributed direct drive. Furthermore, each power module is capable of packet management, networking and communication protocol management.

In a preferred embodiment of the invention, the communication protocol utilized to interconnect the different network elements (power modules) is based on Ethernet/TCP/IP suite (Transmission Control Protocol/Internet Protocol). More specific protocols such as CAN or ARINC 664 can also be used.

Different data access schemes may advantageously be used to suit different electromagnetic distributed direct drive topologies. In Time Division Multiple Access (TDMA) mode, the data streams generated by each network element are multiplexed in time domain: each power module (network element) is allocated a unique time slot in which it is allowed to transmit data. Each power module only transmits in its allocated time slot and receives during the rest of the time. This simple access mode is the preferred solution when few power modules (network elements) are involved, for instance in the case of a tail rotor drive. Mutual synchronization between power modules via the meshed network insures that there is no timing overlap between adjacent time slots.

In Code Division Multiple Access (CDMA) mode the payload (useful information) that needs to be transmitted across the optical network is multiplied with a unique PRN code (Pseudo Random Noise is a signal similar to noise which satisfies one or more of the standard tests for statistical randomness). Multiplying the payload by a high chip rate PRN code results in spectral spreading where the resulting spectrum may be 10 times (or more) broader that the information's spectrum. The resulting data stream is used to modulate the laser diodes (or LED). FIG. 22 depicts the block diagram of the optical front ends of two power modules using CDMA access.

On the receiver side, the useful information is regenerated through synchronized multiplication in shift registers of the received spread signal with the same PRN code used on the transmitter side (FIG. 22). By allocating a unique PRN code to the transmitter of each power module, simultaneous transmission across the same medium is possible, without suffering mutual interference. However, the receiver of a given power module is capable of descrambling at any time the data stream transmitted by any other power module, by multiplying the received signals by the PRN code allocated to the module that needs to be received. By performing a circular rotation of PRN codes, any given power module is capable of sequentially extracting the data streams transmitted by the power modules as well by the Electro-Optical Interface connected to the meshed network.

Another advantage of direct sequence signal spreading is the inherent processing gain (proportional to the PRN chip rate, divided by the payload's data rate). This processing gain advantageously compensates the transmissions losses occurring in the meshed network and is particularly effective on large electromagnetic distributed direct drive. CDMA is the preferred access solution when a high number of power modules and motor elements are involved.

The OFDM access mode utilizes multi-carrier modulation, in particular Orthogonal Frequency Division Multiplexing (OFDM). Like CDMA, this access mode is very robust to mutual interferences and is also a solution when a high number of power modules are involved.

In a different embodiment of the invention Frequency Shift Keying (FSK) of multiple subcarriers allocated to each network element (power module) may also be used.

The same optical feed [3] can simultaneously convey data communication related to power modules management, as well as to flight controls (to the rotor head or propeller hub [28]). This layout, depicted in FIG. 20, may occur when an electromagnetic distributed direct drive drives the main rotor of a helicopter equipped with an optically controlled rotor head (optically controlled blade pitch actuators).

Information segregation may be required in order to prevent accidental interference (or cross coupling) between vital functions, for instance to prevent a faulty uncontrolled network element (e.g. a power module) from interfering with another network element sharing the same transmission medium (e.g. the pitch control of a rotor blade [29]). TDMA access is particularly vulnerable to timing interference and time slot overlapping, whereas CDMA and OFM are quite resilient to code interferences.

In one embodiment of the invention, sub networks are created, by allocating to each vital function of the aircraft its dedicated sub network, for instance one sub-network may be dedicated to flight controls, whereas another sub-network is dedicated to power modules and electromagnetic distributed direct drive control. Traffic isolation between sub-networks is achieved by different means such as, but not limited to:

- Assigning a unique access mode to each sub network (e.g. one sub-network uses TDMA access, whereas the other sub-network uses CDMA or OFDM access).
- Assigning orthogonal coding between sub-network (e.g. by using PRN codes between two sub-networks using CDMA access).
- Assigning significantly different frequencies to the sub-carriers, when OFDM access and/or FSK are used.

In yet another embodiment of the invention, superior sub-network segregation is achieved through the use of Wavelength Division Multiplexing (WDM), where one dedicated wavelength (color) is allocated to each sub-network. WDM requires equipping the optical interfaces of each network element (e.g. power module) belonging to a given network with optical band pass filters set on the wavelength allocated to that sub network. The optical filters, installed onto the photodiodes and Laser (or LED) diodes, reject the unwanted wavelength(s) utilized by other sub network(s). The block diagram depicted in FIG. 22 shows the optical filters installed on the optical front ends of a power module. By the same token, the arrays of redundant laser diodes (or LED) and photodiodes [10] driven by the multichannel Electro-Optical Transceiver Interface [9] are also equipped with a plurality of optical filters tuned at the relevant wavelength. For example, the diode/photodiodes arrays related to flight controls will be equipped with their dedicated filters tuned on one wavelength, whereas the diode/photodiodes arrays dedicated to the control of the electromagnetic distributed direct drive will be equipped with filters tuned on a different wavelength.

Each motor element is integrated in its own dedicated casing [20], [21] that contributes to the structural rigidity of the whole assembly as well as preventing fire propagation or damages resulting from ballistic impacts. Each motor element's casing also enables appropriate EMI/EMC/EMP shielding.

Each rotor assembly can be formed of two halves [22] and [23] (two reversed "Chinese hats") preferably made of metal matrix composite (MMC) and/or carbon nanotubes (CNT) insuring lightness combined with good heat and fire resistance.

Cooling ducts (pipes) can be machined in the top and bottom casings [20] and [21] as well as in the stator's frame [15] to evacuate the heat produced by the power modules and the windings. Liquid cooling is the preferred option for medium to high power systems, although forced air cooling is also possible in some low power applications (e.g. for tail rotor drive or drone application developing up to 40 KW per motor element).

A plurality of ball bearings [2] maintains the coaxial alignment of the main rotor shaft [1] with the electromagnetic distributed direct drive's center line enabling the proper operation of the freewheeling units.

This bearing assembly may carry the propeller's or rotor's thrust, although, in a preferred arrangement, the propeller/rotor thrust may be carried by one or several external bearing(s). The internal bearing assemblies [2] are fitted with piezoelectric vibration sensors enabling mechanical health monitoring and connected to several power module of each motor element.

The electromagnetic distributed direct drive unit provides the following advantages over prior art drive trains applied to aircraft:

- Resilient to EMP, EMI and ESD aggressions;
- Increased survivability to ballistic impacts and fire damage;
- Scalable system: applies to main and tail rotor drives of rotary wing aircrafts as well as fix wing aircrafts, ranging from few kilowatts to hundreds of kilowatts.
- Self-contained system: switching power circuitry is integrated within the plurality of motor elements constituting the electromagnetic distributed direct drive in the form of physically isolated, RF shielded, power modules;
- An internal meshed optical network enables fault tolerant data interconnection between the pluralities of power modules, subsequently solving Electromagnetic Interference and Electromagnetic Compatibility (EMI/EMC) vulnerabilities affecting conventional split drive. The meshed network is capable of simultaneously transmitting data afferent to external flight controls through the use of sub-networking functions and is utilized in place of conventional daisy chain of optical fibers, resulting in improved mechanical resistance, desirable in high vibration environments, as well as enhanced resilience to ballistic impacts and significant weight savings;
- Fault tolerant electro-optical interface complying with common buses and protocols (e.g. ARINC 429 or 629), via a redundant optical transceiver interface;
- Free space data transmission link between the redundant optical transceiver interface and the electromagnetic distributed direct drive, thereby eliminating the need for optical fiber, connectors and data line(s) that would normally interconnect the electromagnetic distributed direct drive with aircraft control system. This feature solves common reliability problems inherent to connector ageing, when operating in a high vibration environment;
- Network based internal distributed processing carried out by microcontrollers embedded in each power module, enabling autonomous decision making, even in the case of complete loss of communication with external control systems;
- Preprogrammed operation, in the case of degraded communication with aircraft control system, or multiple internal failures (e.g. subsequent to fire or ballistic impacts);
- Electrical and Environmental Integrity Monitoring (EEIM) and real time power assignment in function of the state of health (SOH) of the various motor elements and power modules;
- Early warning of impending semiconductors faults, through continuous monitoring and data logging of power transistors' dynamic characteristics;
- Mechanical Integrity Monitoring (MIM), provides early warning of impending bearing/freewheeling failure through the use of spectrum deviance algorithms continuously analyzing the vibration spectrum individually generated by each mechanical component;
- High transient power capability: the transient power produced by an electromagnetic distributed direct drive is mostly constrained by thermal limitations within the stators' windings and transistor circuitry; high number of cycles is possible without impacting the electromagnetic distributed direct drive's service life (by contrast, conventional mechanical gearboxes suffer from service life reduction resulting from irreversible metal fatigue affecting gear assemblies and other moving parts). The direct benefit, in the case of rotary wing application, is better main rotor speed regulation under loads, resulting in safer and more effective aerial work operations;

Main rotor speed regulation during high load factor maneuvers, enabling helicopters equipped with an electromagnetic distributed direct drive to out maneuver conventionally driven machines;

Low torque ripple resulting from the vertical and radial power distribution within the electromagnetic distributed direct drive, leading to low vibration levels;

Long service life: Time Before Overhaul (TBO) of an electromagnetic distributed direct drive is typically in the 20,000 Hours range as opposed to an average of 4,000 Hours for conventional mechanical gearboxes;

Significantly lowered production and operating costs (complex lubrication and cooling systems are no longer needed; furthermore, internal dimensional tolerances of electric motors are not as stringent as gears, resulting in lowered production cost). The system revolves around identical power modules that can be mass produced at low cost; and Lighter weight than redundant electric drive trains resulting from a distributed architecture and a highly integrated and compact design (no power cabling between controllers and motor).

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The present application may be used as a basis or priority in respect of one or more future applications and the claims of any such future application may be directed to any one feature or combination of features that are described in the present application. Any such future application may include one or more of the following claims, which are given by way of example and are non-limiting in regard to what may be claimed in any future application.

PARTS LIST

1 Main Shaft (rotor shaft of a rotary wing aircraft, or propeller shaft of a fix wing aircraft)
2 Bearing, with associated vibration sensor device
2a Freewheeling unit
3 Optical feed
4 Optical splitter
5 Optical fiber held in-between top and bottom rotor assemblies
6 Hub lens assembly
7 Outer rotor lenses
8 Outer ring-type optical coupler inserted in the power modules assembly, pressed against the inner redundant optical interface
8a Inner ring-type optical coupler (for hub)
9 Fault tolerant Electro-Optical Transceiver Interface providing free space data transfer between the electromagnetic distributed direct drive and main flight computer
10 Array of redundant Laser (or LED) Diodes and photodiodes and optical filters.
11 Power Module's optical interface: redundant LASER (or LED) diodes & photodiodes array and optical filters.
12 Optical resolver (coded reflecting target)
12a Optical resolver (LED & Photodiode and associated lens)
12b Mirror
12c Inner prismatic reflector
13 Power Module (power switching circuitry, optical communication interface, resolver system and processors)
14 Stator winding
15 Winding frame, with cooling circuit (if required)
16 DC input
17 Insulation
18 Hallbach Magnet assembly
19 Magnet assembly (other than Hallbach topology)
20 Top casing with built-in cooling circuit
21 Bottom casing with built-in cooling circuit
22 Rotor frame top assembly
23 Rotor Frame bottom assembly
24 Cylindrical shield for the protection of the optical feed
24a rubber boot
25 Retention tubes
26 Elastomeric stops
27 Main rotor gearbox
28 Rotor head, or propeller hub
29 Rotor blade, or propeller blade
30 Rod end bearing
31 Airframe
32 Electromagnetic Distributed Direct Drive
33 Electric cables
34 Double flat ribbon with central insulation
35 Motor element

GLOSSARY

ARINC Aeronautical Radio, Incorporated
CAN Controller Area Network (CAN bus)
CDMA Code Division Multiple Access
CPU Central Processing Unit
CNT Carbon Nanotubes
DC Direct current
DME Distance Measuring Equipment
ECM Electromagnetic Counter Measures
ECCM Electromagnetic Counter-Counter Measures
EDF Electric Ducted Fan
EEIM Electrical & Environmental Integrity Monitoring
EMD$^3$ Electromagnetic Distributed Direct Drive
EMI/EMC Electromagnetic Interference/Electromagnetic Compatibility
EMP Electromagnetic Pulse
ESD Electrostatic Discharge
FEC Forward Error Correction
FPGA Field Programmable Gate Array
HF High frequency (3-30 MHz)
IGBT Insulated Gate Bipolar Transistor
IP Internet Protocol
LASER Light Emission by Stimulated Emission of Radiation
LED Light Emitting Diodes
MIM Mechanical Integrity Monitoring
MMC Metal Matrix Composite
MOSFET Metal Oxide Semiconductor Field Effect Transistor
OFDM Orthogonal frequency-division multiplexing
PPMT Parallel Path Magnetic Technology
PRN Pseudo Random Noise
RF Radio Frequency
RFI Radio Frequency Interference
SMC Soft Magnetic Composites
SOH State of Health
TDM Time Division Multiplex
TDMA Time Division Multiple Access VHF Very High Frequency (30-300 MHz)
WDM Wavelength Digital Multiplexing

The invention claimed is:

1. An electromagnetic distributed direct drive unit configured to cause one or more airscrews to rotate; comprising:
at least one shaft to provide lift, propulsion and/or attitude control of an aircraft, the electromagnetic distributed direct drive unit being connected directly to the at least one shaft and comprising a plurality of elements, each motor element connected directly to the at least one shaft and configured to generate a fraction of a total mechanical power required to provide lift, propulsion and/or attitude control of the aircraft, and including at least one fixed stator and at least one rotating rotor, wherein:
(a) each motor element includes a plurality of power modules radially disposed about the fixed stator; and
(b) each power module comprises one or more programmable integrated circuits including microcontrollers or field-programmable gate arrays, which interface with the associated circuitry, a power transistor switching circuitry for energizing the at least one stator's windings and a dedicated DC filtering circuitry;
wherein the power modules are individually programmed and configured to operate as interconnected network elements belonging to a network to enable fault tolerant distributed processing.

2. The electromagnetic distributed direct drive unit according to claim 1, further including external connectivity between the electromagnetic distributed direct drive and an aircraft flight control system provided by means of optical link.

3. The electromagnetic distributed direct drive unit according to claim 2, wherein the free space optical link is a redundant free space optical link.

4. The electromagnetic distributed direct drive unit according to claim 2, wherein an optical link is established via at least one optical feed between an array of laser diodes or LED's and one or more light sensing devices connected to a redundant multi-channel electro-optical interface.

5. The electromagnetic distributed direct drive unit according to claim 1, wherein internal network elements are interconnected through an optical network.

6. The electromagnetic distributed direct drive unit according to claim 1, further including external connectivity between the electromagnetic distributed direct drive and an aircraft flight control system provided by means of electrical connections.

7. The electromagnetic distributed direct drive unit according to claim 6, wherein internal network elements are interconnected through an electrical network.

8. The electromagnetic distributed direct drive unit according to claim 1, where internal and external data communications are achieved via a multipath meshed optical network.

9. The electromagnetic distributed direct drive unit according to claim 8, wherein the multipath meshed optical network includes at least one optical feed comprising at least one optical waveguide and a plurality of associated optical splitters.

10. The electromagnetic distributed direct drive unit according to claim 9, wherein the multipath meshed optical network includes an optical feed comprising at least one optical waveguide and a first end of the optical feed points towards a distant electro-optical interface enabling data communication with the aircraft flight control system via the free space optical link; and a second end of the optical feed interfaces with optically driven pitch actuators controlling the angle of incidence of a plurality of blades constituting the airscrew.

11. The electromagnetic distributed direct drive unit according to claim 8, wherein the multipath meshed optical network further includes:
(a) at least one optical coupler enabling the distribution of light signal to the plurality of power modules; and
(b) a plurality of lenses, optical fiber assemblies, or mirrors assemblies, integrated within the rotor.

12. The electromagnetic distributed direct drive unit according to claim 1, wherein data communication between the power modules and/or external systems is based on Transmission Control Protocol/Internet Protocol and uses one or more of the following data access schemes:
(a) Time Division Multiple Access;
(b) Code Division Multiple Access;
(c) Orthogonal Frequency Division Multiplexing; and/or
(d) Frequency and/or phase shift keying of multiple subcarriers.

13. The electromagnetic distributed direct drive according to claim 1, further including creation of one or more sub networks to provide data communication between the power modules or between external systems such as the aircraft flight control system, wherein internetwork isolation between sub-networks communicating through a common medium is enhanced by wavelength division multiplexing.

14. The electromagnetic distributed direct drive according to claim 1, wherein a power transistor circuitry is integrated into each power module to drive and associated stator's windings and a switching sequence of the power transistor circuitry involves one or more of the following:
(a) angular sensing of each rotor by one by one;
(b) equipping each power module with at least one optical resolver unit including a transmitter/receiver assembly and sending one or more light beams to an optical encoder mounted onto the rotor to derive the rotor's angular position from the reflected signals;
(c) equipping each power module with one or more magnetic resolvers detecting the magnetic field variation produced by the magnet assembly installed onto each rotor; and/or
(d) using sensorless function, where current and/or voltage variations in the stator's windings are used to derive the angular position of the rotor.

15. The electromagnetic distributed direct drive according to claim 14, wherein each power module broadcasts its own angular positioning information to the plurality of power modules driving the same rotor to enable identification of one or more power modules affected by faulty angular resolver.

16. The electromagnetic distributed direct drive according to claim 1, where DC power is fed to the motor elements by a fault tolerant multipath energy distribution network.

17. The electromagnetic distributed direct drive according to claim 1, wherein protection circuits are integrated into at least one power module and inserted in a DC line, each protection circuit including:
(a) a filtering circuitry in the form of a multipole filter;
(b) a transient protection to provide electromagnetic pulse protection; and
(c) an electrostatic discharge protection system.

18. The electromagnetic distributed direct drive according to claim 1, wherein each motor element has a metallic casing to act as a shield against the magnetic and electric components of radio waves.

19. The electromagnetic distributed direct drive according to claim 1, wherein each power module is protected by a Radio Frequency shield protecting each power module, in the form of lightweight metal and/or conductive or dissipative polymer.

20. The electromagnetic distributed direct drive according to claim 1, directly connected to the main shaft, enabling regenerative breaking by conversion of the energy produced by the airscrew during aggressive or acrobatic maneuvers into electrical current fed into a bank of battery, and/or a bank of super capacitors, and/or a resistive load in order to prevent over speeding of the airscrew(s).

21. The electromagnetic distributed direct drive according to claim 1, wherein each rotor transmits mechanical power to the shaft via a mechanical or electromagnetic freewheeling unit.

22. The electromagnetic distributed direct drive according to claim 1, further including a plurality of motor elements rotating at constant or variable speed, wherein each a configuration of each motor element based on one or more of the following topologies:
    (a) Axial Flux,
    (b) Radial Flux,
    (c) Parallel Path Motor Technology,
    (d) Transverse flux.

23. Electromagnetic distributed direct drive according to claim 1, wherein the electromagnetic distributed direct drive is integrated into a series hybrid topology or full electric topology and where the power modules and their power switching circuitry are used as an inverter to recharge the propulsion battery pack.

24. Electromagnetic distributed direct drive according to claim 1, wherein distributed processing provided by the one or more microcontrollers and/or field-programmable gate arrays in each power module enables one or more of the following:
    (a) autonomous self-healing capability including fault detection and reconfiguration of remaining viable power modules in the event of degraded or lost communication with the flight control system;
    (b) interpretation of pilot inputs by detecting torque on the main shaft and triggering a sequence of power settings corresponding to predefined flight patterns;
    (c) early failure warning of the power switching circuitry integrated into each power module; and/or
    (d) early warning of mechanical failure through real-time analysis of the vibration spectrum generated by the bearing assemblies.

25. Electromagnetic distributed direct drive according to claim 24, wherein early failure warning of the power switching circuitry is provided by monitoring precursors of power transistor failure resulting including real-time measurement of static and dynamic parameters and comparing the same to baseline parameters measured in a healthy device, where a predefined magnitude and/or rate of divergence between the measured parameters and baseline parameters triggers an early failure warning.

26. Electromagnetic distributed direct drive according to claim 24, wherein the vibration spectrum is measured by a plurality of sensors installed in a vicinity of each bearing assembly, wherein the rate and/or magnitude of divergence from a baseline parameter measured in a healthy device trigger a mechanical failure alarm.

27. Electromagnetic distributed direct drive according to claim 1, wherein the plurality of motor elements are coaxially mounted.

* * * * *